(12) United States Patent
McGowan et al.

(10) Patent No.: US 8,898,303 B2
(45) Date of Patent: Nov. 25, 2014

(54) ENTERPRISE GRADE RIGHTS MANAGEMENT

(76) Inventors: Albert J. McGowan, Phoenix, AZ (US); Niko Huffman, Chandler, AZ (US)

( * ) Notice: Subject to any disclaimer, the term of this patent is extended or adjusted under 35 U.S.C. 154(b) by 458 days.

(21) Appl. No.: 13/228,194

(22) Filed: Sep. 8, 2011

(65) Prior Publication Data
US 2012/0066386 A1  Mar. 15, 2012

Related U.S. Application Data

(60) Provisional application No. 61/381,366, filed on Sep. 9, 2010.

(51) Int. Cl.
  *G06F 15/173* (2006.01)
  *G06F 21/00* (2013.01)
  *G06F 9/06* (2006.01)

(52) U.S. Cl.
  CPC . *G06F 21/00* (2013.01); *G06F 9/06* (2013.01)
  USPC ........... 709/225; 709/203; 709/223; 709/224; 709/229; 726/2; 726/21; 726/22; 726/23; 726/24; 726/25; 726/26

(58) Field of Classification Search
  USPC ........................ 709/223–225; 726/2, 21–26
  See application file for complete search history.

(56) References Cited

U.S. PATENT DOCUMENTS

| | | | |
|---|---|---|---|
| 2007/0083380 A1* | 4/2007 | Martinez | 705/1 |
| 2007/0174866 A1* | 7/2007 | Brown et al. | 725/28 |
| 2008/0083001 A1* | 4/2008 | Peacock et al. | 725/56 |
| 2009/0205027 A1* | 8/2009 | Salazar et al. | 726/6 |
| 2011/0058675 A1* | 3/2011 | Brueck et al. | 380/277 |
| 2011/0078732 A1* | 3/2011 | Hutohison | 725/39 |
| 2011/0237236 A1* | 9/2011 | Wickman et al. | 455/419 |

* cited by examiner

*Primary Examiner* — Ario Etienne
*Assistant Examiner* — Kidest Mendaye
(74) *Attorney, Agent, or Firm* — Kilpatrick Townsend & Stockton LLP

(57) ABSTRACT

Various arrangements for controlling access to a set of media items accessible via multiple channels are presented. An indication of a media item may be stored. Multiple sets of rules may be received, including a first and second set of rules. Requests for access to the media item may be received from a first and second application. The first request may be determined to be is associated with a first channel, wherein the first channel is associated with the first set of rules. Access to the media item may be provide in accordance with the first set of rules. The second request may be determined to be associated with a second channel. Access to the media item may be provided in accordance with the second set of rules.

21 Claims, 14 Drawing Sheets

ENTERPRISE GRADE RIGHTS MANAGEMENT

CROSS REFERENCES

This application claims priority to Pat. Appl. No. 61/381,366, filed Sep. 9, 2010, in the United States, entitled "Enterprise Grade Rights Management." This provisional application is hereby incorporated for all purposes.

BACKGROUND

This disclosure relates in general to cloud-based computer processing and, but not by way of limitation, to managing access rights to media items for streaming.

Access to a media item, such as a video, via an online on-demand system may typically be controlled in a static manner. For example, the media item may be accessible to only end-users that satisfy specific criteria. If multiple, different sets of criteria are to be used to evaluate whether access to the media item should be granted, multiple instances of the media item may need to be stored (e.g., one for each set of criteria). Such an arrangement may not be efficient for managing access rights to a significant number of media items.

SUMMARY

Various arrangements for controlling access to a set of media items accessible via multiple channels are presented. In some embodiments, a computer system for controlling access to a set of media items accessible via multiple channels is presented. The computer system may comprise a processor and a computer-readable storage medium. The computer-readable storage medium may store instructions configured to cause the computer system to store an indication for each media item of a set of media items. The instructions may be further configured to cause the computer system to receive a first set of rules that is used to determine accessibility of a first subset of the set of media items. The instructions may be further configured to cause the computer system to receive a second set of rules that is used to determine accessibility of a second subset of the set of media items. The first subset of the set of media items and the second subset of the set of media items may comprise at least one media item in common. The instructions may be further configured to cause the computer system to receive a first request for access to a media item of the set of media items from an instance of a first application. The media item may be common to the first subset of the set of media items and the second subset of the set of media items. The first application may be executed remotely from the computer system. The instructions may be further configured to cause the computer system to determine the first request is associated with a first channel. The first channel may be associated with the first application and the first set of rules. The instructions may be further configured to cause the computer system to provide access to the media item in accordance with the first set of rules. The instructions may be further configured to receive a second request for access to the media item from an instance of a second application. The second application may be executed remotely from the computer system and the first application. The instructions may be further configured to determine the second request is associated with a second channel. The second channel may be associated with the second application and the second subset of the set of media items. The instructions may be further configured to provide access to the media item in accordance with the second set of rules.

Various embodiments may include one or more of the following: The instructions configured to cause the computer system to provide access to the media item in accordance with the first set of rules may comprise instructions configured to cause the computer system to transmit, to the first application, a first universal resource locator that indicates a location at a content data network from where the first application is to retrieve the media item. The instructions configured to cause the computer system to provide access to the media item in accordance with the second set of rules may comprise instructions configured to cause the computer system to transmit, to the first application, a second universal resource locator that indicates the location at the content data network from where the second application is to retrieve the media item. The media item may be a chunk of a media asset. Continuous playback of the chunk is configured to occur for, at most, a minute, and continuous playback of the media asset, is configured to occur for, at minimum, three minutes. The first set of rules may define a geographical region in which playback of the media item is permitted. The geographical region may be defined as a set of Internet Protocol (IP) addresses. The first set of rules may specify a time period in which playback of the media item is permitted. The instructions may be further configured to cause the computer system to generate a manifest that indicates multiple media items of the first subset of the set of media items accessible by the first application, wherein each of the multiple media items indicated are in accordance with the first set of rules. The instructions may be further configured to cause the computer system to transfer, to the first application, the manifest. At least one media item of the first subset of the set of media items may not be in accordance with the first set of rules. The at least one media item may not indicated in the manifest.

In some embodiments, a method for controlling access to a set of media items accessible via multiple channels is presented. The method may include storing an indication for each media item of a set of media items. The method may include receiving a first set of rules that is used to determine accessibility of a first subset of the set of media items. The method may include receiving a second set of rules that is used to determine accessibility of a second subset of the set of media items. The first subset of the set of media items and the second subset of the set of media items may contain at least one media item in common. The method may include receiving a first request for access to a media item of the set of media items from an instance of a first application. The media item may be common to the first subset of the set of media items and the second subset of the set of media items. The first application may be executed remotely. The method may include determining the first request is associated with a first channel. The first channel may be associated with the first application and the first set of rules. The method may include providing access to the media item in accordance with the first set of rules. The method may include receiving a second request for access to the media item from an instance of a second application. The second application may be executed remotely from the first application. The method may include determining the second request is associated with a second channel. The second channel may be associated with the second application and the second subset of the set of media items. The method may include providing access to the media item in accordance with the second set of rules.

In some embodiments, computer program product for controlling access to a set of media items accessible via multiple channels is presented. The computer program product may comprise instructions, which, when executed, cause a computer system to receive a first set of rules that is used to determine accessibility of a first subset of the set of media items. The computer program product may also comprise instructions, which, when executed, cause a computer system to receive a second set of rules that is used to determine accessibility of a second subset of the set of media items. The computer program product may also comprise instructions, which, when executed, cause a computer system to receive a first request for access to a media item of the set of media items from an instance of a first application. The media item may be common to the first subset of the set of media items and the second subset of the set of media items. The computer program product may also comprise instructions, which, when executed, cause a computer system to determine the first request is associated with a first channel. The first channel may be associated with the first application and the first set of rules. The computer program product may also comprise instructions, which, when executed, cause a computer system to provide access to the media item in accordance with the first set of rules. The computer program product may also comprise instructions, which, when executed, cause a computer system to receive a second request for access to the media item from an instance of a second application. The computer program product may also comprise instructions, which, when executed, cause a computer system to determine the second request is associated with a second channel. The second channel may be associated with the second application and the second subset of the set of media items. The computer program product may also comprise instructions, which, when executed, cause a computer system to provide access to the media item in accordance with the second set of rules.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
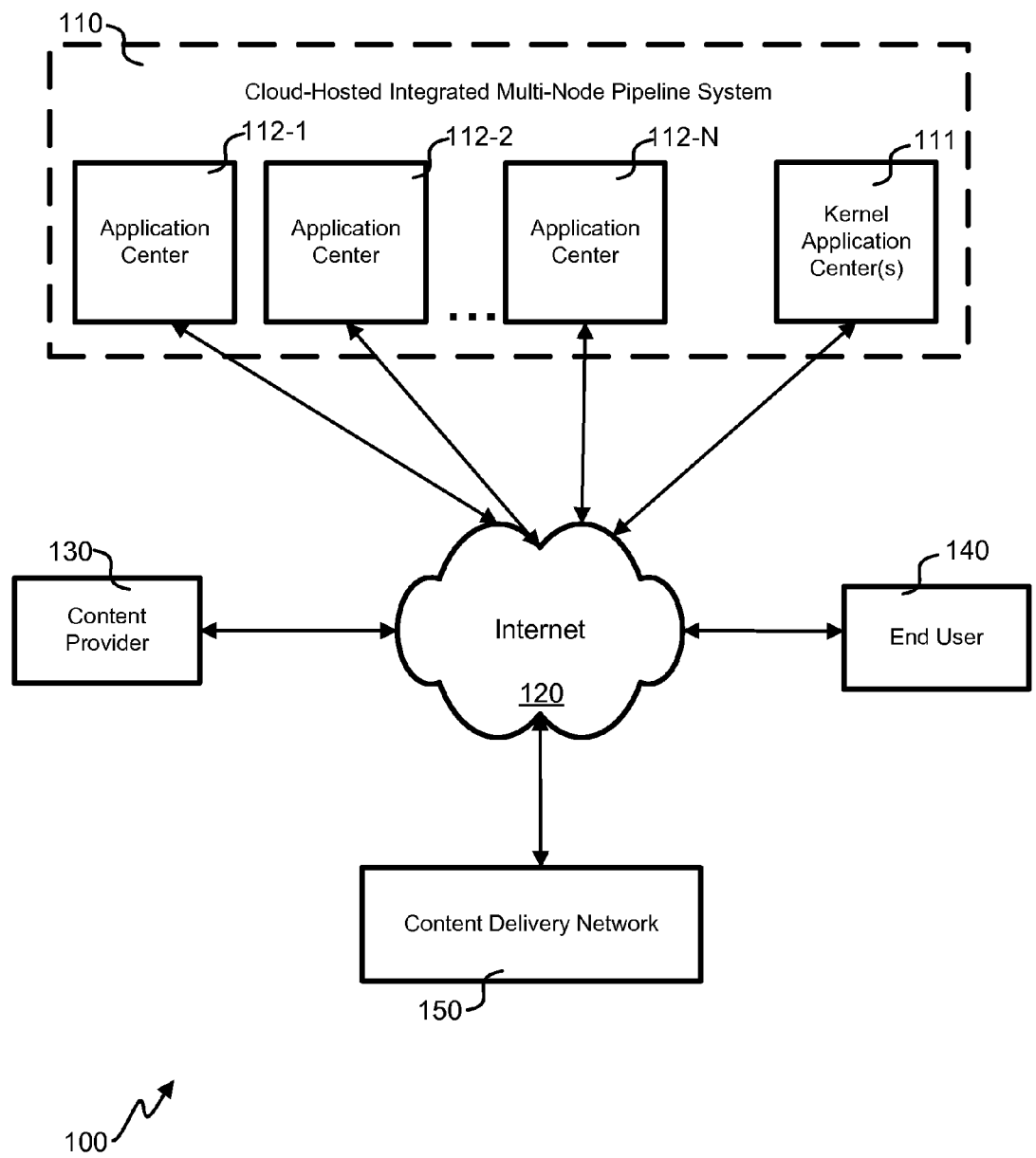
FIG. 1 illustrates a block diagram of an embodiment of a media servicing system.

Flexibility in managing data items, such as media items, may be useful when multiple end-users and/or applications have different access rights depending on factors such as the channel that the media item is accessed through. Further, media items may need to be accessible via multiple channels and have different rules governing access to the media item via each channel. As opposed to fixing various rules directly with media items and potentially having multiple instantiations of the same media item with different rules linked to each instantiation, rules may be established that define access parameters via one or more channels to stored media items. Such an implementation of rules may allow for flexible management of media items, such as media items that are hosted by a content data network. While the content data network may be used to serve media items to an application operating on an end-user's computer system, access to the media item may be governed by rules enforced remotely from the content data network and/or the application.

By way of example only, consider two websites that each provides episodes of sitcoms. The first website may provide access to sitcoms A, B, and C. Further, this first website may allow sitcoms A, B, and C to be viewed using applications 1, 2, and 3. The second website may provide access to sitcoms C, D, and E via applications 4, 5, and 6. The sitcoms, which may be stored in the form of video and/or audio files (e.g., as media assets), may be stored in a common location by a third party. The first and second website may each be accessed as a channel. Therefore, when an end-user accesses the first channel using a first application, the end-user may only be able to view sitcoms A, B, and C. The media items that the end-user is able to view via the first channel may be controlled by a first set of rules associated with the channel and media items. Similarly, if the end-user visits the second channel, the end-user may access media items C, D, and E in accordance with a second set of rules. Sitcom C, the sitcom in common to both channels, may be a single media item (which may be accessible from a content data network), but may have different rules associated with sitcom C based on the channel it is accessed through. For example, while sitcom C may be available via both channels, the application through which the end-user may view and/or listen to the media item may vary and may be controlled by the set of rules linked to each channel.

Such an arrangement may allow for determining which media items are available through each channel and which applications may be used with each media item to be reconfigured quickly. For example, if a cross-promotional agreement was reached between the first and second websites, by only adjusting the rules linked to each channel, it may be possible to make sitcoms previously associated with only the first website be associated with the second website. Further, such a change may not involve any media items needing to be modified and/or copied because the rules are implemented such that the media items themselves do not need to be modified regardless of the channel the media item is being accessed through. Moreover, such flexible sets of rules may allow for highly configurable control of media items.

While the above embodiments may be implemented in a variety of different systems, some particular embodiments may be implemented as part of a media service system. FIG. 1 is a block diagram illustrating a media servicing system 100, according to some embodiments of the present invention. The system may deliver media content to the end-user 140 (alternatively referred to as an end-user or a client) through a network such as the Internet 120. A media asset provided by a content provider 130 can be processed and indexed by cloud-hosted integrated multi-node pipelining system (CHIMPS) 110, and further stored on content delivery network (CDN) 150. Additionally or alternatively, the CHIMPS 110 may also be adapted to store the media asset.

The media servicing system further enables a content provider 130 or other entity to gather information regarding end-user behavior during media playback. For example, a content provider 130 can be provided with data indicating that end-users tend to stop watching a video at a certain point in playback, or that end-users tend to follow links associated with certain advertisements displayed during playback. With this data, a content provider 130 can adjust factors such as media content, advertisement placement and content, etc., to increase revenue associated with the media content and provide the end-user 140 with a more desirable playback experience.

End-user 140 can request a media asset to hear and/or see with a client program running on a personal computer or other electronic device connected to Internet 120. The client program can be, for example, a media player, browser, or other application adapted to request and/or play media assets. In response to a request for a media asset, the CHIMPS 110 can utilize any number of application centers 112 and/or kernel application center(s) 111 to provide the client program with a data object concerning the requested media asset. The data object can include information about the media asset, including where the media asset can be located, such as within the CDN 150 or within the CHIMPS 110 itself. Location information may be provided by Universal Resource Indicator (URI), a Universal Resource Locator (URL) or other indicator. During playback of the media asset, the CHIMPS 110 can collect data regarding the playback through beaconing provided by a client program executed on a device operated by the end-user 140 and/or indexing service from within the CHIMPS and/or CDN. The CHIMPS 110 can subsequently provide the data and/or any analytics information derived from the data to the content provider 130.

Figure 2A:
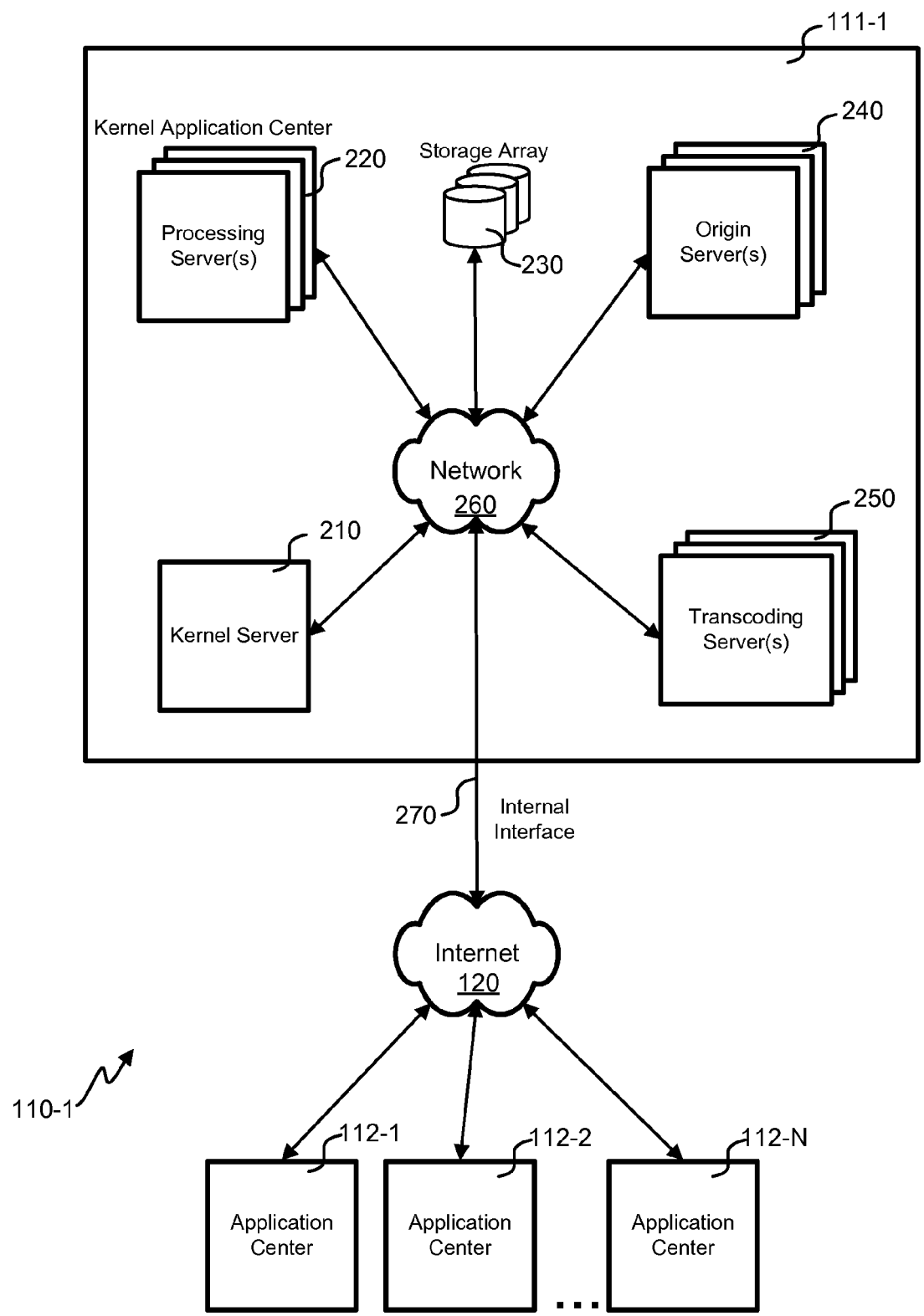
FIG. 2A illustrates a block diagram of an embodiment of a kernel application center connected with application centers.

FIG. 2A is a block diagram illustrating an embodiment of a kernel application center 111-1 connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end-user 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260 such as a local area network (LAN) and can include one or more data object origin servers 240 and a storage array 230 with which data objects and/or media assets may be stored and distributed. The storage array 230 may also be utilized by services running on processing server(s) 220 and/or transcoding server(s) 250 that may require temporary or long-term storage. Kernel server 210 can utilize processing server(s) 220 or transcoding server(s) 250 to provide various functional capabilities to the CHIMPS 110.

For example, as described in more detail below, the CHIMPS 110-1 can provide transcoding service for media assets provided by a content provider 130 for syndication. Such a service can allow a content provider 130 to upload a media asset to an application center 112, after which the application center 112 would notify the kernel server 210 that the media asset has been uploaded. The kernel server 210 can then notify services running on the processing server(s) 220 of the upload. These services can utilize transcoding server(s) 250 to transcode the media asset, which can then be moved to a CDN and/or stored locally by storage array 230 and data object origin server(s) 240. Services running on the processing server(s) 220 can also update the associated data object stored by the storage array 230 and data object origin server(s) 240.

Figure 2B:
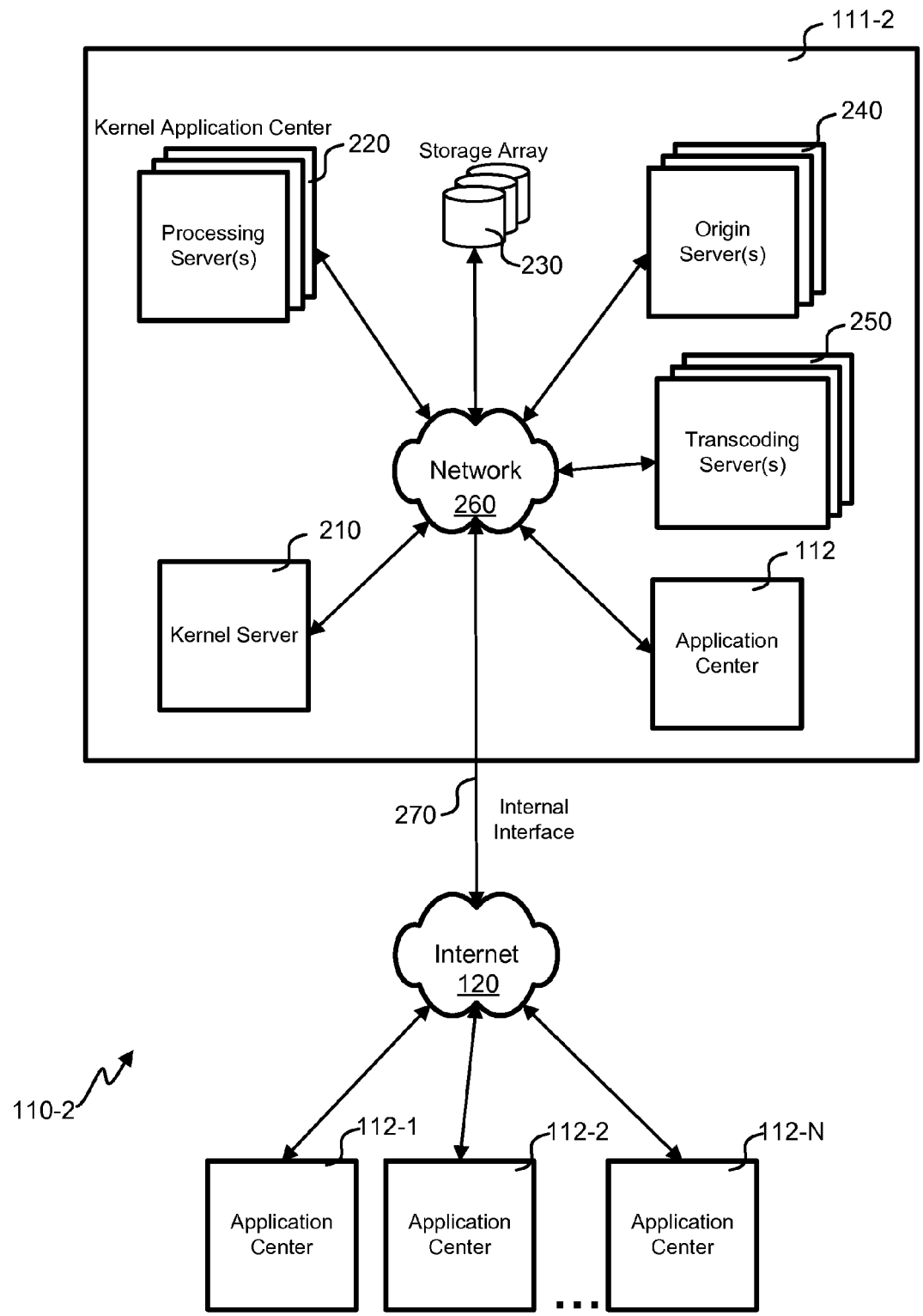
FIG. 2B illustrates a block diagram of an embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers with one or more application centers incorporated therein. Additionally or alternatively, components of the kernel application center may be incorporated into one or more application centers 112 in the CHIMPS 110 to provide quicker access to certain functionality.

Figure 3:
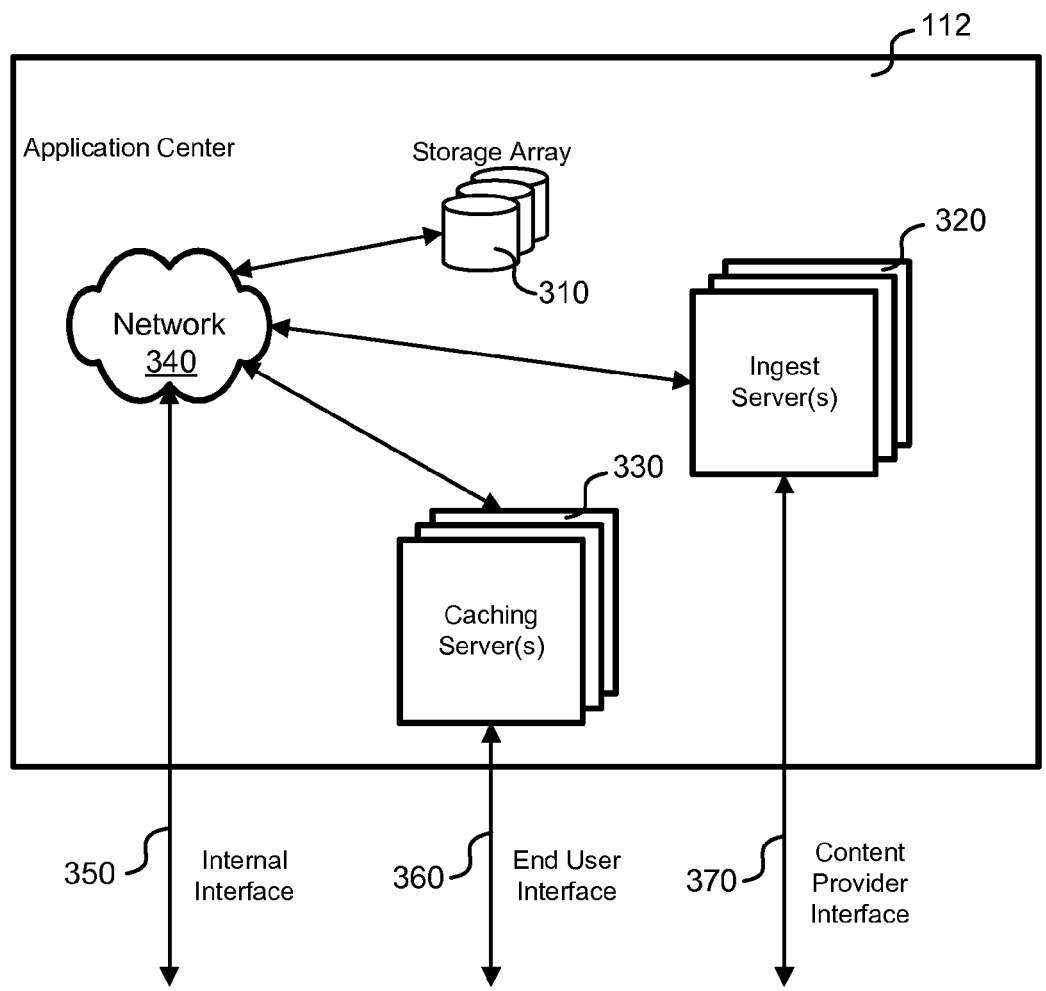
FIG. 3 illustrates a block diagram of an embodiment of an application center.

FIG. 3 is a block diagram illustrating an embodiment of an application center 112. The application center 112 can include caching server(s) 330 and a storage array 310 for storing and distributing data objects of media assets requested by end-users through end-user interface 360. Caching server(s) 330 and storage array 310 can also be used to collect, process, and/or store metrics information from beaconing data, media chunk requests, and/or other data sources, including data collected through end-user interface 360. The application center 112 can further include ingest server(s) 320 for ingesting uploaded media assets from a content provider 130 through a content provider interface 370. The media assets may be stored on the storage array 310. As with the kernel application center 111, the components of the application center 112 can be communicatively linked through a network 340, such as a LAN. The application center 112 can further include an internal interface 350, providing a communication link from the application center to the rest of the CHIMPS 110. It is through internal interface 350, for example, that media assets stored on storage array 310 can be made available to a kernel application center 111 for services such as transcoding.

Figure 4A:
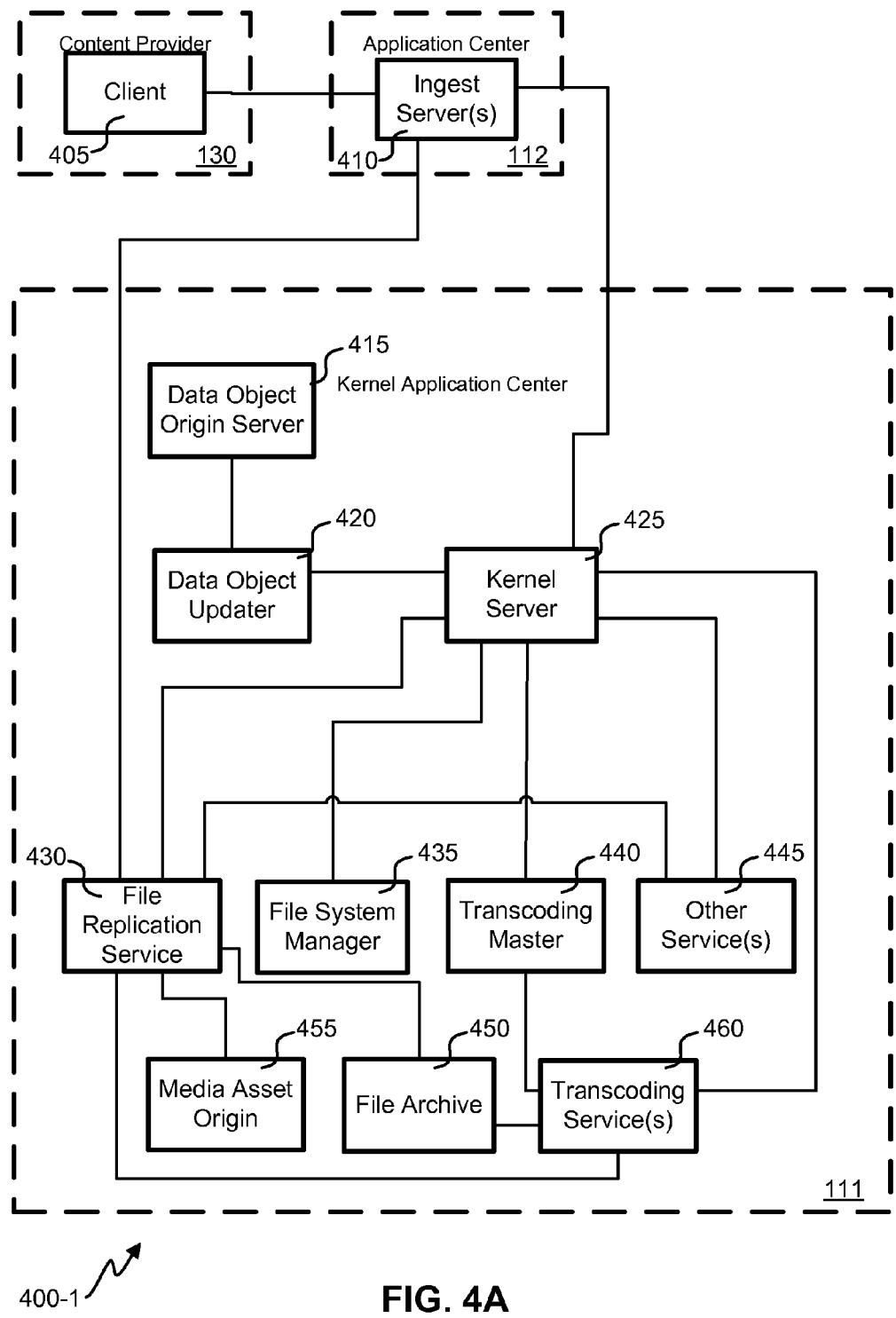
FIG. 4A illustrates a block diagram of an embodiment of processes and objects utilized by a cloud-hosted integrated multi-node pipelining system for media ingestion.

FIG. 4A is a block diagram 400-1 of processes and objects utilized by the CHIMPS 110 for media ingestion, according to some embodiments. Although FIG. 4A further indicates the physical systems which may execute or store these processes and objects, it will be understood that the processes and objects disclosed may be executed or stored on more than one system, including systems not disclosed in FIG. 4A. In other words, the processes and objects shown in FIG. 4 allow for a variety of implementations through one or more of hardware, software, firmware, microcode, etc.

Media can be ingested into the CHIMPS 110 when a content provider 130 uploads a media asset to ingestion server(s) 410 in an application center 112 by utilizing a client 405. The client 405 can be a stand-alone application or browser-based, for example, and can communicate with ingest server(s) 410 through an application programming interface (API) configured for the ingestion of media assets.

Ingest server(s) 410 can communicate with devices in the kernel application center 111 executing programs such as kernel server 425 and file replication service 430. The kernel server 425 can be configured to organize the workflow among services such as transcoding master 440, file system manager 435, and other services 445 (e.g., analytics, dynamic API, etc.) Upon a particular event, for example, the kernel server can be configured to notify the relevant services of the event, causing the services to process tasks associated with the event.

The file replication service 430, under direction of the kernel server 425, can coordinate the movement of the media assets between services; for example, retrieving the uploaded media asset from the ingest server(s) 410 and storing it on the file archive 450, or retrieving transcoded media assets from transcoding server(s) 460 and storing them in the media asset origin.

The data object updater 420 keeps the data object origin server 415 up to date in response to any changes in the system. When, for example, a file is uploaded, transcoded, and stored in media asset origin 455, the location and other metadata concerning the transcoded media assets need to be created or updated in the data object origin server 415 to ensure an end-user who accesses the object in the data object origin server 415 has the correct information regarding the related media asset. Because the data object updater 420 receives updates from the kernel server 425 (which is notified when a transcoded media asset is stored in the media asset origin 455), the system ensures the data objects in the data object origin server 415 are constantly up to date.

The upload of a media asset to the ingest server(s) 410, as described above, can provide an example of how the kernel server 425 may coordinate workflow. For instance, in response to the upload, the ingest server(s) 410 can notify the kernel server 425 that a media asset has been uploaded. The kernel server 425 informs the file replication service 430 of the uploaded media asset, and the file replication service 430 moves the uploaded media asset into the file archive 450 and notifies the kernel server 425 of the move. In response, the kernel server 425 notifies the file replication service 430, the file system manager 435, and the transcoding master 440 of the move. The file replication service 430 then will know it can delete the uploaded media asset from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media asset from the file archive 450 to create transcoded media assets. The transcoding service(s) 460 notify the kernel server 425 once transcoding is complete, and the kernel server 425 relays this information to the file replication service 430. The file replication service 430 then takes the transcoded media assets from the transcoding services 460 and moves them to the media asset origin 455. Once the file replication service 430 notifies the kernel server 425 of the move, the kernel server 425, in turn, notifies the file replication service 430 and the data object updater 420. The data object updater 420 updates the data object origin server 415 accordingly, and the file replication service 430 deletes the transcoded media assets from the transcoding services 460.

The modular nature of the system enables all tasks associated with an event to be completed quickly. As illustrated in the example above, workflow relating to a particular event, such as a media asset upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased.

Figure 4B:
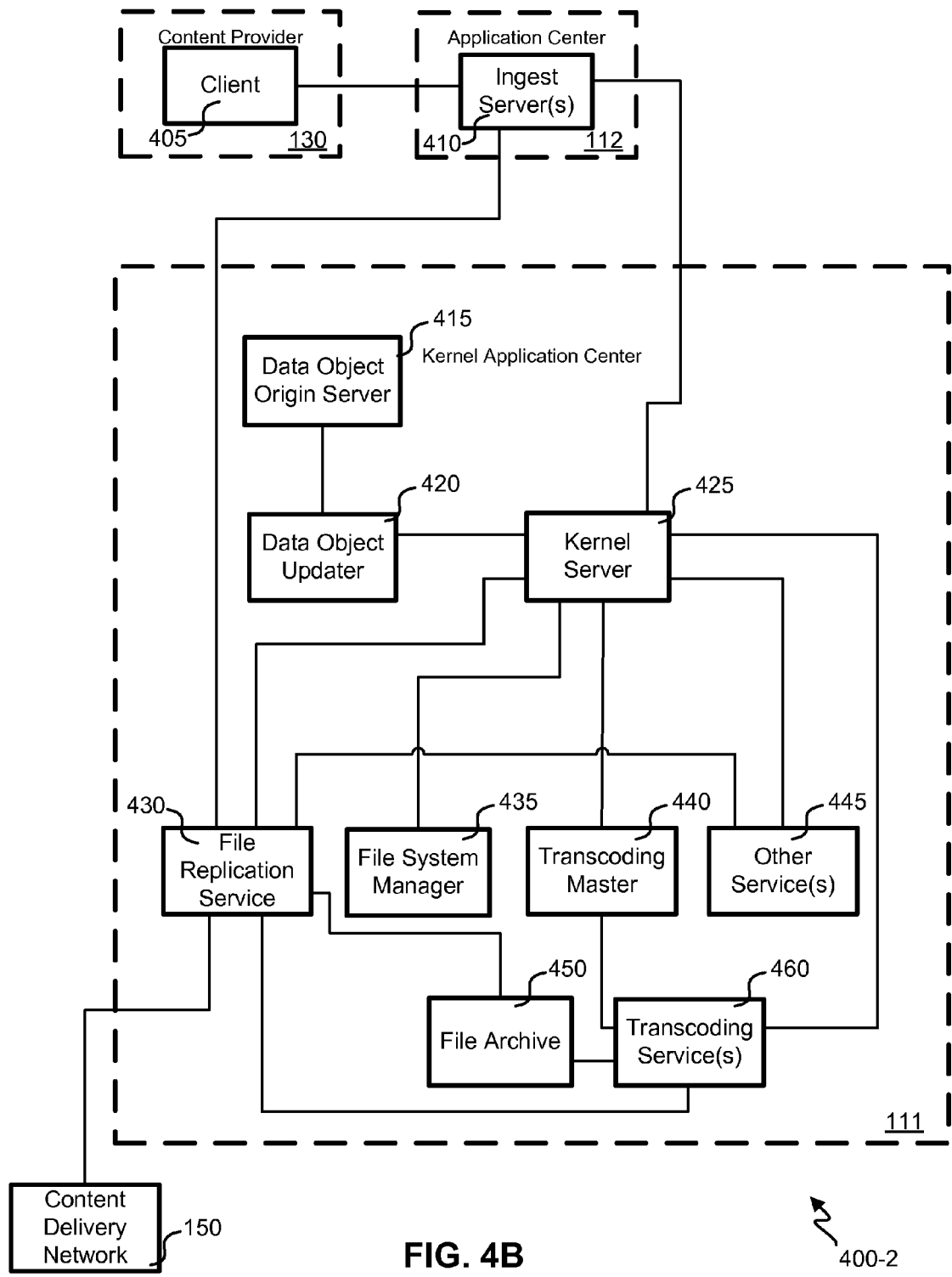
FIG. 4B illustrates a block diagram of an embodiment of processes and objects utilized by a cloud-hosted integrated multi-node pipelining system for media ingestion involving a content data network.

FIG. 4B is a block diagram 400-2 of processes and objects utilized by the CHIMPS 110 for media ingestion, according to some embodiments. Block diagram 400-2 may be substantially similar to block diagram 400-1 except for the use of a content delivery network in place of media asset origin 455. Therefore, in block diagram 400-2, as opposed to the media assets being stored at media asset origin 455, they are stored at content delivery network 150, which may be operated and maintained by a third party.

Figure 4C:
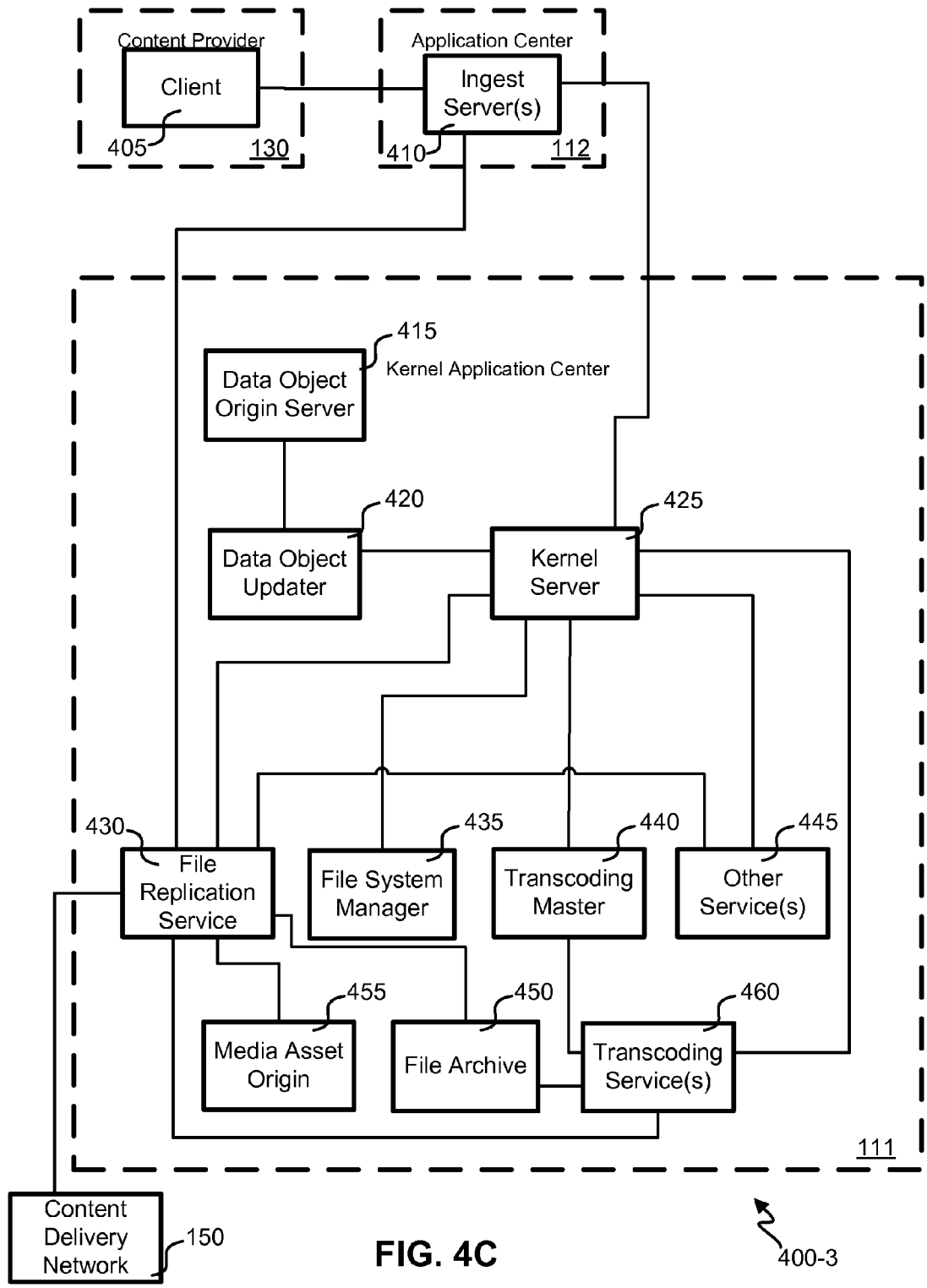
FIG. 4C illustrates a block diagram of another embodiment of processes and objects utilized by a cloud-hosted integrated multi-node pipelining system for media ingestion involving a content data network.

FIG. 4C is a block diagram 400-3 of processes and objects utilized by the CHIMPS 110 for media ingestion, according to some embodiments. Block diagram 400-3 may be substantially similar to block diagram 400-1 except for the use of a content delivery network in conjunction with media asset origin 455. Here, in block diagram 400-3, media assets may reside at either media asset origin 455, content delivery network 150, or both.

Figure 5:
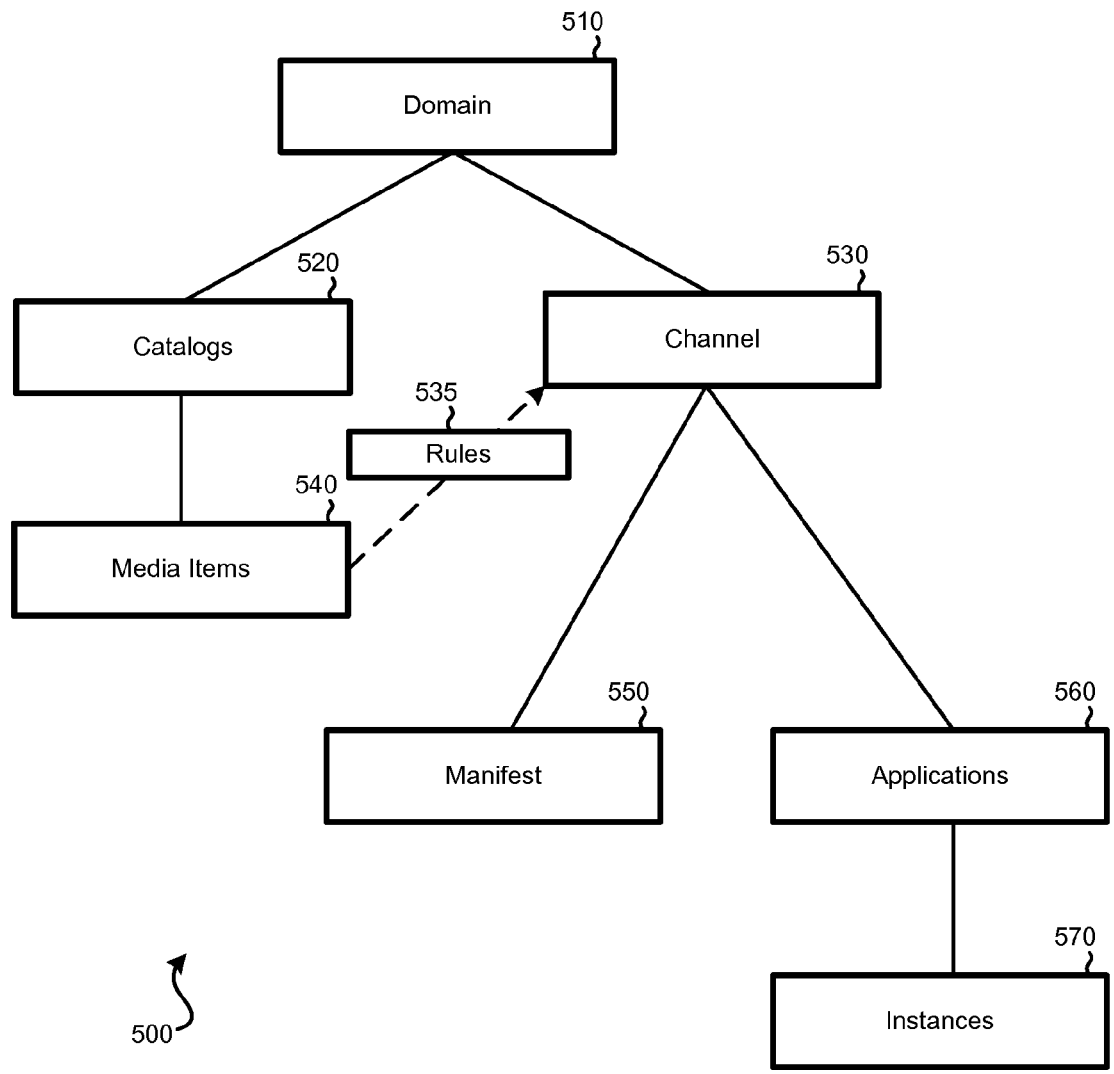
FIG. 5 illustrates a block diagram of an embodiment of a system configured for controlling access to media items.

Referring to FIG. 5, a simplified embodiment of a system 500 configured for controlling access to media items (or, more generally, data items) accessed by an end-user via a channel is present. System 500 may include part of CHIMPS. More specifically, system 500 may include part of an Application Center. Media items may be video, animation, and/or audio items, which an end-user may wish to play back or otherwise access. A media item may refer to a media asset or a chunk of a media asset. A media asset may be an entire media file configured for streaming (for example, an entire episode of a television program). A chunk may be a portion of the media asset. For example, when streamed, a media asset may be broken into a series of chunks configured to be played sequentially. When a media asset is broken into chunks ("chunked"), additional chunks associated with other content may be periodically inserted among the chunks, such as advertisements. Each chunk may be played back to an end-user sequentially. If a media item is being played back, this may mean that a media asset is being played back or a chunk of a media asset is being played back.

An end-user, via a public network, such as the Internet, or a private network, such as a corporate local area network, may access domain 510. The end-user accessing access domain 510 may allow an end-user access to one or more channels. An end-user, using a particular application, may access a website to access various media items. When accessing the website of a content provider (which may be a channel), the end-user may be directed to domain 510. Domain 510 may be operated by an entity separate from the entity that operates the webpage.

In FIG. 5, only one channel, channel 530, is illustrated for simplicity. A channel may represent a grouping of various media items that are available through a particular content provider. The content provider may be the entity that operates the webpage initially accessed by the end-user. For example, a channel, such as channel 530, may be linked with a specific content provider that provides media items to end-users, such as a television network (e.g., NBC, FOX, CBS). Besides media items, a channel may be used by a software provider to allow access to binary data files. Such an arrangement involving channels may be used to access binary and/or media items. Collectively, these items are referred to as data items. It should be understood that while the various embodiments discussed herein focus on the use of media items, similar systems and methods may be applied to data items.

Channel 530 may be linked with applications 560. Applications 560 represent various applications that are permitted to be used by an end-user to access the media items accessible through channel 530. Applications 560 may represent various media players that are available to play back media items accessible via channel 530. Associated with each application of applications 560, one or more instances 570 may be executed. For example, an application may be a media player for a mobile device associated with a particular content provider (e.g., HBO, NETFLIX, HULU). Other applications associated with the same content provider may be associated with the same or a different channel; for example, a media player configured for playback on a television.

Manifest 550 may represent a listing of media items associated with channel 530. Manifest 550 may contain universal resource indicators (e.g., universal resource locators (URLs)) that identify locations of media items. Manifest 550 may also contain various metadata, such as length of playback data, order of playback data, etc. A manifest may be generated based on rules 535 as applied to the instance of the application being used to access the media items. For example, a manifest may be a playlist of various media items available to the end-user via a particular instance of an application. Manifest 550 may be a playlist that defines an order of playback of media items accessible via channel 530. Manifest 550 may be generated when an end-user accesses access domain 510 using an instance of an application.

Linked to access domain 510 may be one or more catalogs 520. Catalogs 520 may be used to store and organize media items 540. A catalog of catalogs 520 may store one or more media items. As an example, a catalog may be devoted to storing videos, while another catalog may be devoted to storing audio recordings. Catalogs 520 may store indications of media items (e.g., the location of each media item), rather than the media items themselves. In some embodiments, media items stored as part of catalogs 520 may be used to distribute the media item to various end-users for playback, or another location of the media items may be used. For example, rather than using media items 540 of catalogs 520 to serve end-users, a location of the media items may be stored, such as a location of a media item on a content data network. This location may be provided to the application of the end-user rather than the media item itself.

One or more of media items 540 may be accessible through one or more channels, such as channel 530. A same media item of media items 540 may be accessible via more than one channel. As such, even if each channel is operated/controlled on behalf of a different content provider, the same media item may be used to serve requests through that channel. It also may be possible that some media items of media items 540 are not accessible via any channels. Media items 540 may represent media items owned by a variety of entities (e.g., content providers) that are being stored in a common location or on a common network. For example, if an entity wishes for a media item to be available to end-users only within a particular geographical region (e.g., a state, a country, the world, etc.), the entity may provide the media item to a second entity that has servers dispersed throughout the geographical area. Restriction may be performed based on the IP addresses of the end-users. The media item may then be accessible via the second entity's servers. This second entity may provide similar services for multiple different content providers of media items. Further, each of these content providers of media items may want to define various rules governing when and how its media items may be accessed.

Rules 535 may define how the media items of media items 540 linked to channel 530 may be accessed. Rules 535 may serve at least a dual purpose: 1) to enforce security procedures; and 2) to enforce business rules. The security procedures may be directed to ensuring that a particular instance of an application and/or an end-user attempting to access a media item is the only instance of that application/user accessing the media item (e.g., a URL is not being redistributed to other end-users and/or applications). The business rules may refer to rules created by the content provider that governs which applications, which end-users, and when playback of particular media items are permissible. Some of rules 535 may only apply to some of media items 540.

For example, a content provider associated with channel 530 may wish to define a certain time period in which one or more media items of media items 540 that are associated with channel 530 may be accessed. Outside of this time period, when an end-user accesses channel 530, the media item may not be accessible due to rules 535, despite the fact that the media item is still among media items 540. Within this time period, the media item may be accessible through channel 530. Another rule that may be defined for channel 530 may include a geographic restriction (e.g., geofencing). This may involve restricting access to one or more media items of media items 540 to a particular geographical region (e.g., a city, county, state, country, continent, IP domain, etc.). Within this geographical region, rules 535 may dictate that a particular media item of media items 540 be available to the end-user; however, outside this geographical region, the media item may appear unavailable (e.g., may not appear during a search or may be demarked unavailable). Therefore, an end-user may access one or more media items through channel 530, which is in turn accessed through domain 510. Through channel 530, the end-user may have access to a subset of media items 540 defined accessible to the end-user by rules 535. The subset of media items 540 accessible in accordance with rules 535 may be accessible to the end-user via applications 560.

Rules 535 may be flexible in what security rules and/or business rules can be enforced. Rules 535 may apply to all media items accessible via a channel, such as channel 530, or may apply only to specific media items available via a channel. Rules 535 can include one or more rules. As previously discussed, rules may include a geographic restriction, which may be enforced based on the IP address at which a request for a media item originates. Similarly to a geographic restriction, rules may be used to define particular IP addresses that are permitted or prevented from viewing media items. Rules 535 may include an IP address white list (that is, IP addresses permitted to view the media items associated with rules 535) or an IP blacklist (IP addresses prohibited from viewing the media items associated with rules 535). Rules 535 may be used to permit or deny access to a range of IP addresses. For example, if a content provider desires to provide access to media items for all end-users of an Internet service provider, the range of IP addresses associated with that Internet service provider may be set via rules 535 to permit access to the associated media items.

Rules may include permitting access on a time period basis. For example, a particular media item may only be made accessible starting at a certain time, until a certain time, or for a particular time period. As an example, a content provider may desire an episode of a television program to become available immediately after the television program has been broadcast. As such, the television program may be stored as a media item and associated with the role that identifies the time at which the television program is to become available for streaming.

Rules 535 may restrict what devices and/or applications are permitted to view particular media items. Based upon request, it may be possible to identify what devices and/or applications are being used to attempt to access the media item. Which media items are permitted to be accessed may vary depending on the device and/or application. For example, a same end-user may have access to different media items when a first application is used as compared to a second application.

Rules 535 may also be used to enforce parental controls. For example, based on a request, if an end-user is determined to be a certain age, such as 12, media items associated with a motion picture rating more restrictive than PG may not be accessible. Previously defined preferences for video and audio may also be enforced via rules 535. For example, if an end-user and/or application that the end-user is executing is associated with particular video and/or audio formats only, rules 535 may be used to present only media items in the supported formats. Rules 535 may also be used to determine whether a paid and/or free version of a particular media item is available to the end-user via channel 530.

Rules 535 may be used to ensure a quality of service (QoS) for playback. If the media item being provided to the instance of the application is in the form of chunks and a certain QoS as defined by rules 535 is not being realized, the location of the chunks of the media item used to serve the end-user may be modified. For example, chunks may be provided from a different content data network in an attempt to realize the QoS as defined by rules 535.

In response to a request for a media item received from an instance of an application through channel 530, at least two options may be possible. If the request complies with rules 535 that are associated with the media item requested, a URL to the media item (e.g., the media asset or a chunk of the media asset) may be returned to the instance of the application of the end-user. If the request is not in compliance with rules 535, no URL may be returned. Additionally, a denial message may be transmitted to the instance of the application.

Figure 6:
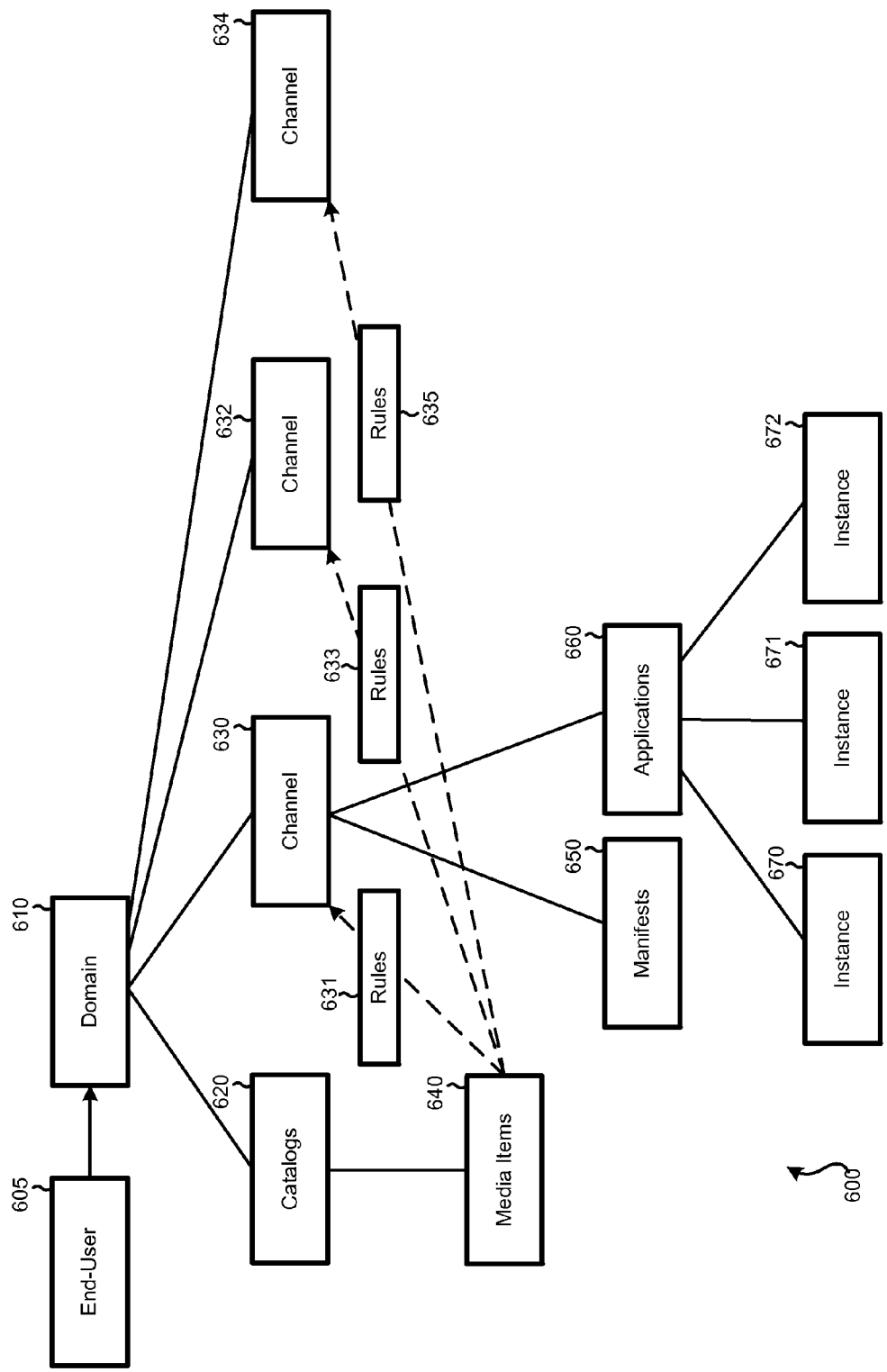
FIG. 6 illustrates a block diagram of another embodiment of a system configured for controlling access to media items.

FIG. 6 illustrates a block diagram of an embodiment of system 600 that is configured for controlling access to media items that may be accessible via multiple channels. End-user 605 may access multiple different channels via domain 610. In system 600, end-user 605 can access channels 630, 632, and 634 via domain 610. If end-user 605 attempts to access media items via channel 630, end-user 605 may have access to a subset of media items 640 (stored via catalogs 620) according to rules 631. Channel 630 may represent channel 530 of FIG. 5, or may represent some other channel. Rules 631 may represent rules 535 of FIG. 5, or may represent some other set of rules. Rules 631 may define what media items of media items 640 end-user 605 may access via channel 630 and under what conditions those media items may be accessed. Rules 631 may be associated with channel 630; some or all of these rules may be specific to particular media items associated with channel 630. As such, rules 631 may be applicable to all media items available via channel 630. Some or all of rules 631 may be applicable to particular media items available via channel 630.

Applications 660 may represent applications 560 of FIG. 5 or may represent some other group of applications. Each application of application 660 may represent an application that may be used via channel 630 to access the subset of media items of media items 640 permitted by rules 631 to be accessed by end-user 605. Instance 670, instance 671, and instance 672 may represent different instances of one or more of applications 660. Manifests 650 may present one or more playlists available through channel 630 that define available media items and/or an order of playback of some of the subset of media items of media items 640 available via channel 630 permitted by rules 631.

Channels 632 and 634 represent other channels, possibly accessible by a different network or Internet address from channel 630. Channels 632 and 634 may represent channels associated with other content providers from the content provider of channel 630. For example, each of these channels may be associated with a different television network. For simplicity, channels 632 and 634 are not shown as linked with manifests, applications, or instances. However, it should be understood that each of these channels may be accessible via various applications (which may be the same or different) from applications 660 linked to channel 630, various playlists (which may be the same or different) from playlists 650, and instances of applications (which may be the same or different from instances 670, 671, and 672 linked to channel 630).

Channel 632 may be linked to rules 633. Rules 633 may define access for end-user 605 (and/or other end-users) to media items 640. For example, some of the same media items of media items 640 may be accessible via both channels 630 and 632. Further, a media item that is only accessible via channel 630 may be made accessible through channel 632 by only modifying the rules associated with the channels. For example, it may only be necessary to change rules 633, with no change necessary to the media item itself. This may allow for expeditious changes to which media items are available via each channel because the media items 640 (nor may additional copies of such media items be required) are not altered by the channels they are available through.

Further rules 635 may define which of the media items are available to end-user 605 via channel 634. Again, the media items made available to the end-user via channel 634 may include some (or all) of the same media items available via channels 632 and 630. Further, because a media item is available through multiple channels (and possibly through different applications based on the channel), only one instance of the media item may be present in media items 640.

Rules 631, 633, and 635 may represent rules similar to previously discussed rules 535. Each of these sets of rules may contain one or more of the restrictions discussed in relation to rules 535. Each of these sets of rules may be defined by the content provider associated with the channel. The content provider may be permitted to access and modify the rules associated with the content provider's channel. In some embodiments, the rules may be provided to CHIMPS. In some embodiments, an interface provided by CHIMPS may be used by the content provider associated with the channel to define the rules.

By way of example, if channel 630 has made available a video from among media items 640, rules 631 may specify that the video is available to end-users in the United States. Therefore, if an end-user from the United States accesses channel 630, the end-user may be able to access the video. However, if the same end-user (or some other end-user) accesses channel 630 from some other country, the video may not appear as accessible via channel 630. The entity operating channel 630 may change this by only having rules 631 modified, with no change to the video stored among media items 640 being necessary.

Further, if the entity operating channel 632 acquired rights to the video, it may make the video available to end-users via channel 632 by only modifying rules 633. In other words, no modification to media items 640 may be necessary because the video is already stored among media items 640. Further, even if channel 632 uses one or more different applications to present the video to the end-user different from applications 660 of channel 630, no modification may be necessary to the video of media items 640. Rather, channel 632 may have different applications linked to it for playback of media items.

Figure 7:
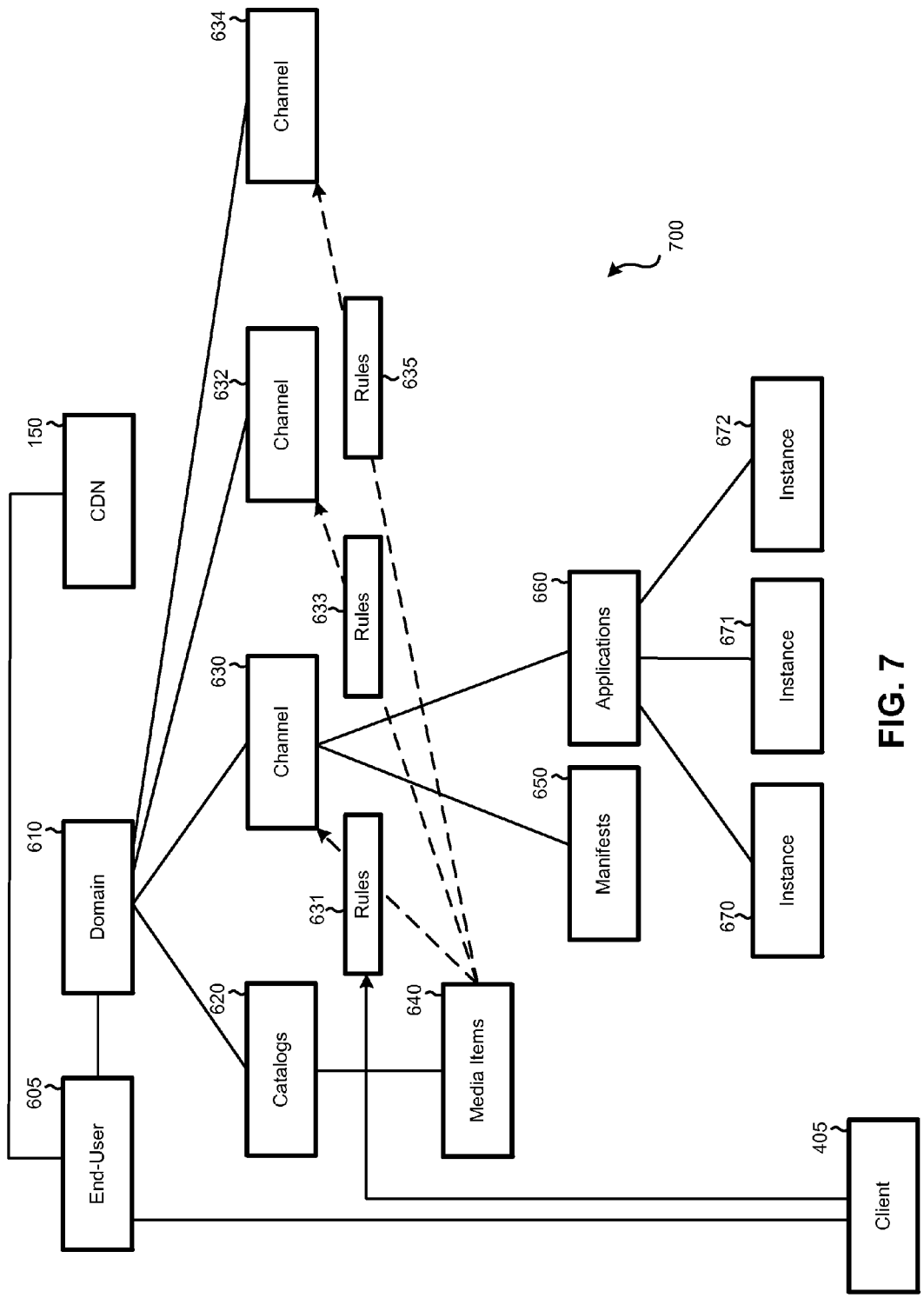
FIG. 7 illustrates a block diagram of an embodiment of a system configured for controlling access to a set of media items including a content data network and a client.

FIG. 7 illustrates a block diagram of an embodiment of a system 700 configured for controlling access to media items involving a content data network and a client. System 700 includes client 405 and CDN 150 in addition to the components of system 600. Client 405 may refer to a content provider that is in communication with CHIMPS and/or end-user 605. System 700 may represent an embodiment of system 500 and/or system 600.

End-user 605 may communicate directly with client 405 for authentication purposes. For example, an end-user may be authenticated by a client 405 to have permission to access a channel associated with client 405. In the illustrated embodiment of FIG. 7, channel 630 is associated with client 405. Assuming end-user 605 is authorized to access channel 630, client 405 may provide end-user 605 with an authentication token to be provided to domain 610 of CHIMPS. In some embodiments, authentication information may be provided from end-user 605 to domain 610. In turn, this authentication information may be sent by CHIMPS to client 405 for authentication. In some embodiments, domain 610 may handle authentication for client 405.

Client 405 may be able to edit rules 631 that correspond to channel 630 and/or media items associated with channel 630. Client 405 may be permitted to access an API that allows rules 631 to be modified. Client 405, which may be a content provider, may be a separate entity from CHIMPS. While only one client (client 405) is illustrated as in communication with CHIMPS, it should be understood that many different clients may be in communication with CHIMPS in order to manage rules associated with various channels.

As previously discussed, manifests 650 may contain URLs and/or various metadata that is transmitted to end-user 605. Such a manifest may be generated dynamically based on the rules applicable to the channel being accessed by the end-user via an instance of an application. For example, if end-user 605 is accessing channel 630 via domain 610, rules 631 may be used to generate a manifest that identifies various media items that are permissible to be accessed by the end-user. Such a manifest may be used as a playlist by the end-user to access the various permissible media items.

While rules 631 may be used to generate the manifest, between the time when the manifest was generated and when end-user 605 attempts to play back media items via the URLs listed in the manifest, end-user 605 may no longer be permitted access to one or more media items listed in the manifest in accordance with rules 631. For example, if rules 631 specify a time in which a media item is available, the media item may have been available when the manifest was generated. However, by the time the media item is attempted to be played by the end-user 605, the time period may have expired. As such, despite the media item being identified in the manifest, the media item may not be permitted to be streamed to end-user 605.

As previously discussed, a media item may be a chunk. As such, a manifest provided to an end-user may specify chunks of a media asset. Each of these chunks may represent a portion of the media asset. A chunk may be a short segment of a larger media asset. For example, a chunk may be 1, 2, 3, 4, 5, 10, 15, or 20 seconds in length. The media asset may, for example, be 1, 2, 3, 4, 5, 10, 20, 30, or 60 minutes in length. As such, a single chunk may represent a small portion of the media asset. As the end-user 605 attempts to retrieve consecutive chunks from the manifest, rules 631 may be reevaluated. If end-user 605 begins to stream a media asset, and during the streaming the end-user 605 no longer complies with rules 631, streaming may cease. As such, rules 631 may be evaluated on a chunk-by-chunk basis.

While media items may be stored within catalogs of CHIMPS, media items 640 may also represent indications of media items. Rather than CHIMPS providing media items to end-users, such as end-user 605, a URL that indicates the location of the media item may be provided to end-user 605. The URL may point to an instance of the media items stored by a content data network, such as CDN 150. As such, end-user 605, via the instance of the application being used by the end-user to access the media asset, may retrieve the media item from CDN 150. In such embodiments, CHIMPS may be used for rule enforcement, while a CDN, such as CDN 150, is used to stream the media item to end-user 605. CDN 150 may be operated by an entity separate from client 405 and CHIMPS.

In some embodiments, authentication is handled between end-user 605 and client 405. Rule enforcement is handled by CHIMPS, and streaming of the media item is handled by CDN 150. CHIMPS may dynamically create the manifest that is transferred to end-user 605. This manifest may be in accordance with the rules associated with the channel the end-user is accessing. These rules may also be accessed when the individual media items specified within the manifest are requested by end-user 605. While systems 600 and 700 illustrate a computerized device of a single end-user (represented as end-user 605) accessing domain 610, it should be understood that greater numbers of end-users may be accessing domain 610.

Figure 8:
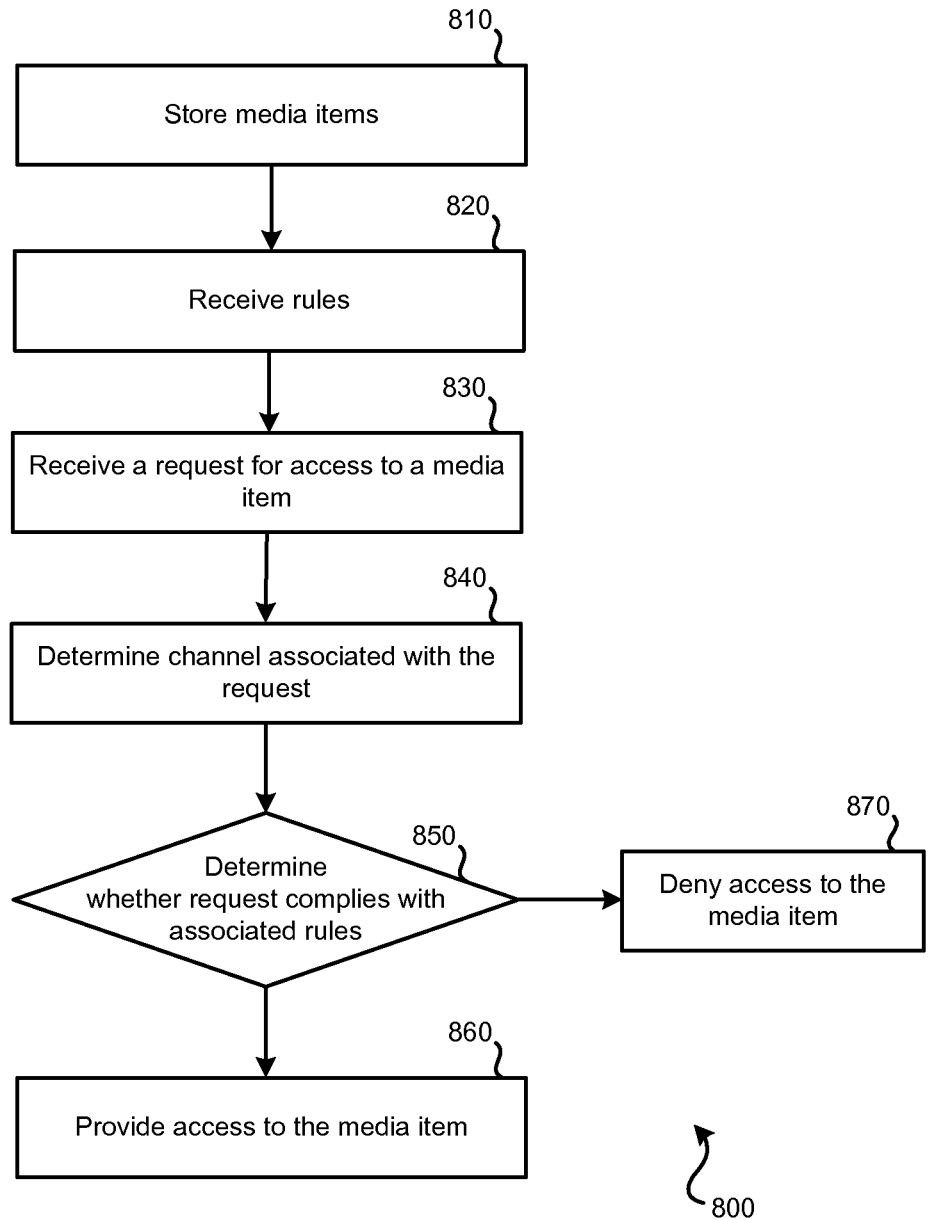
FIG. 8 illustrates an embodiment of a method for controlling access to media items.

The systems of FIGS. 5-7 may be used to perform various methods. FIG. 8 illustrates an embodiment of a method 800 for controlling access to media items. Method 800 may be performed using the systems of FIGS. 5-7 or some other system that is configured for controlling access to media items. Each step of method 800 may be performed by a computer system. Each step of method 800 may be performed by CHIMPS. More specifically, each step of method 800 may be performed by a computer system of an application center of CHIMPS.

At step 810, a plurality of media items may be stored. The stored media items may be stored in one or more catalogs. In some embodiments, rather than storing the media items themselves, links, such as URLs, to other locations storing the media items may be stored. For example, these other locations may include one or more content data networks.

At step 820, rules may be received. These rules may be received from one or more different content providers, which may be referred to as clients. These rules may define which media items are available through which channels. The rules may also identify which media items are available to end-users based on characteristics of the end-user and/or the application being used by the end-user to access a channel. The rules received at step 820 may be associated with a particular channel. The rules may also be associated with particular media items.

At step 830, a request may be received for access from an end-user. The request may be for access to a channel in general or for one or more specific media items via a channel. As such, this request may come in the form of the end-user attempting to access a particular channel or as a request for a specific media item.

At step 840, a channel may be identified that is associated with the request received from the end-user. Based upon the application identified by the end-user's request, a particular channel may be identified. As an example of this, if the end-user attempts to access domain 510 using a media streaming application associated with HBO, it may be determined that the HBO channel is associated with the end-user's request.

At step 850, it may be determined whether the request received from the end-user complies with rules that correspond to the channel and/or the media items associated with the channel. In response to determining whether the request received from the end-user complies with the rules associated with the media items of the channel, access to one or more media items may be provided to the end-user at step 860. Such access may include providing the end-user with a dynamically-generated manifest that contains various URLs associated with one or more media assets accessible by the end-user. The various URLs presented in the manifest may correspond to chunks of a media asset and/or various media assets. In some embodiments, such access may include streaming a particular media item to the end-user without the use of the manifest. If a manifest is provided, access may also be evaluated when a URL from the manifest is accessed. Alternatively, a manifest may be provided that indicates chunks of the particular media item. If the end-user is attempting to access all media assets available to the end-user's particular channel, the manifest may contain URLs corresponding to a plurality of media assets available to the end-user via the channel. If the request from the end-user is for a particular media item, the particular media item may be streamed to the end-user. Streaming of a media item to the end-user may occur from the system that evaluates the rules (e.g., CHIMPS) or from some other computerized system, such as a content data network.

If, at step 850, the request received from the end-user does not comply with the rules associated with the channel and/or media items requested by the end-user, access may be denied to the media item at step 870. The end-user may be notified that access is not granted, or the request may simply fail to return the media item.

Figure 9:
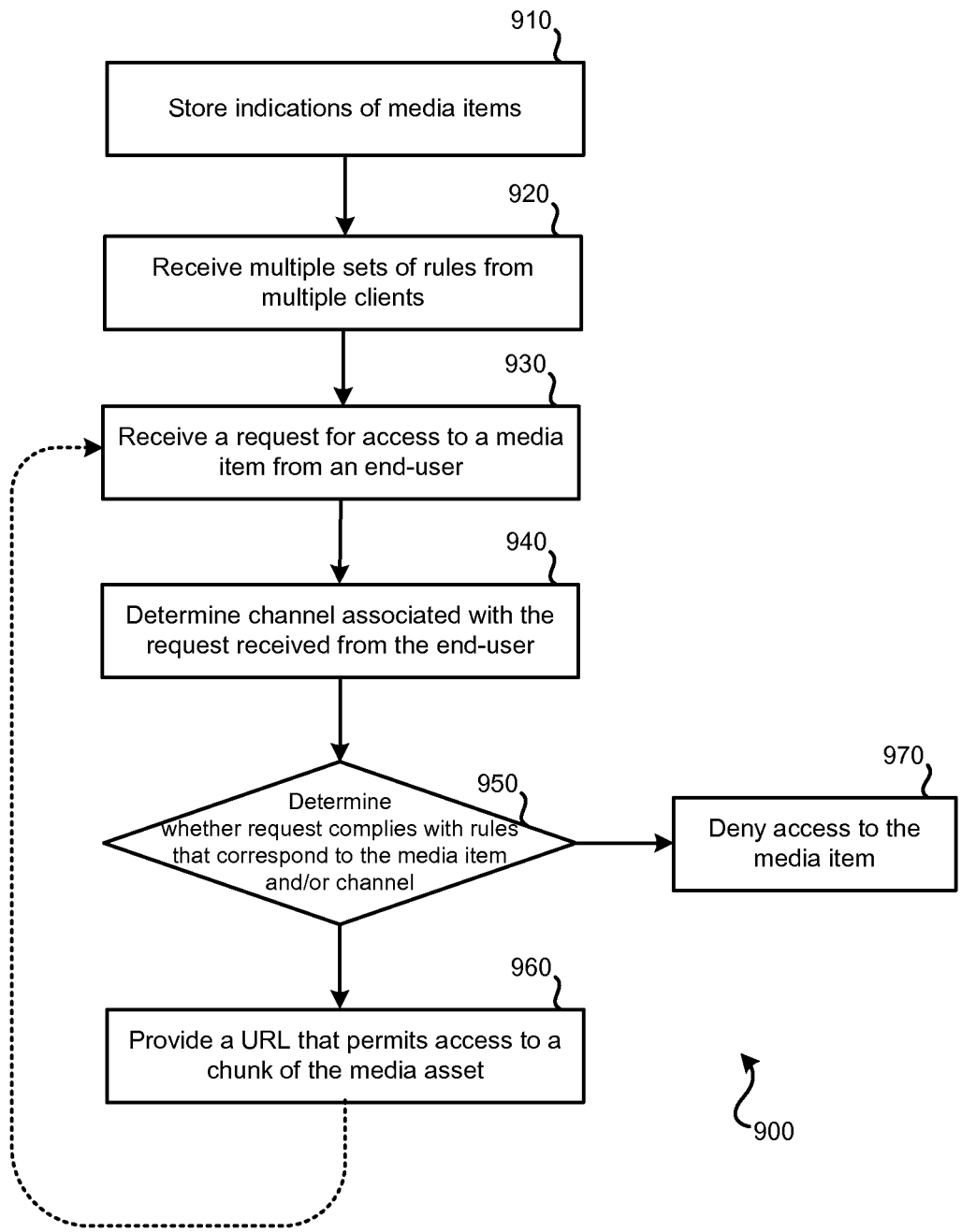
FIG. 9 illustrates another embodiment of a method for controlling access to a set of media items.

FIG. 9 illustrates an embodiment of a method 900 for controlling access to media items. Method 900 may be performed using the systems of FIGS. 5-7 or some other system that is configured for controlling access to media items. Each step of method 900 may be performed by a computer system. Each step of method 900 may be performed by CHIMPS. More specifically, each step of method 900 may be performed by an application center of CHIMPS. A computer system, which may be part of CHIMPS, an application center, or some other system may be used to perform method 900. Method 900 may represent a more detailed embodiment of method 800.

At step 910, a plurality of indications of media items may be stored. Links, such as URLs, to other locations storing the media items may be stored. For example, these other locations may include one or more content data networks. In addition to storing the links, a copy of each media item may be stored.

At step 920, multiple sets of rules may be received. These rules may be received from multiple different content providers, which may be referred to as clients. These rules may define which media items are available through which channels. The rules may identify which media items are available to specific end-users based on the identity of the end-user and/or the application being used by the end-user to access the media items. Content providers may be permitted to modify such rules as desired. Rules received at step 920 may be associated with a particular channel. As such, different channels may have different rules. The rules may also be associated with particular media items. Accordingly, different media items may have different associated rules.

At step 930, a request may be received for access from an end-user. The request may be for access to all media items available via a particular channel or for one or more specific media items available via the channel. As such, this request may come in the form of the end-user attempting to access a particular channel or for a specific media item.

At step 940, a channel may be identified that is associated with the request received from the end-user. Based upon the application identified within the end-user's request, a particular channel being accessed by the end-user may be identified. As an example, if the end-user attempts to access domain 510 using a media streaming application associated with HBO, it may be determined that the HBO channel is associated with the end-user's request.

At step 950, it may be determined whether the request received from the end-user complies with the rules that correspond to the channel and/or media item being accessed. In response to determining whether the request received from the end-user complies with the rules associated with the media items of the channel, access to one or more media items may be provided to the end-user at step 960. While the end-user may be permitted to access some media items available via a channel, other media items of the channel may not be accessed by the end-user. For example, based on the time and/or date, the application the end-user is using, and/or the geographic location of the end-user, the media items that are available to the end-user may change.

At step 960, one or more URLs may be provided to the end-user to be used for accessing chunks of a media asset. In some embodiments, the chunks are transferred directly from the system performing method 900. Access may include providing the end-user with a dynamically-generated manifest that contains various URLs associated with one or more media assets accessible by the end-user in accordance with the rules. The various URLs presented in the manifest may correspond to chunks of one or more media assets. In some embodiments, a URL may be provided to the end-user without the use of a manifest. If the request from the end-user is for a particular media item, a URL for a chunk of the particular media item may be streamed to the end-user. In some embodiments, a manifest may be provided that indicates chunks of the particular media item. If the end-user is attempting to access all media assets available through a particular channel, the manifest may contain URLs corresponding to chunks of a plurality of media assets available to the end-user via the channel. Media items listed in such a manifest may be re-evaluated for compliance with associated rules when specifically requested by the end-user. Streaming of the media items to the end-user may occur from the system that evaluates the rules (e.g., CHIMPS) or from some other computerized system, such as a content data network.

Following step 960, method 900 may return to step 930. At step 930, a request for the next (sequential) chunk may be received. As such, steps 930 through 960 may repeat multiple times in order to provide the end-user with each chunk of a media asset. For each chunk, it may be determined whether the request for the chunk complies with the rules associated with the media asset. While the end-user may have permission to view a first chunk of the media asset, the rules may prevent the end-user from viewing one or more later chunks. For example, an available time period specified within the rules associated with the media asset may expire after the end-user has successfully requested some number of chunks. Accordingly, by not granting the end-user permission to access later chunks, the end-user may be prevented from viewing a remainder of a media asset.

If, at step 950, the request received from the end-user does not comply with the rules associated with the channel and/or media items requested by the end-user, access may be denied to the media item at step 970. The end-user may be notified that access is not granted, or the request may simply fail to return chunks of a media asset and/or a manifest.

Figure 10:
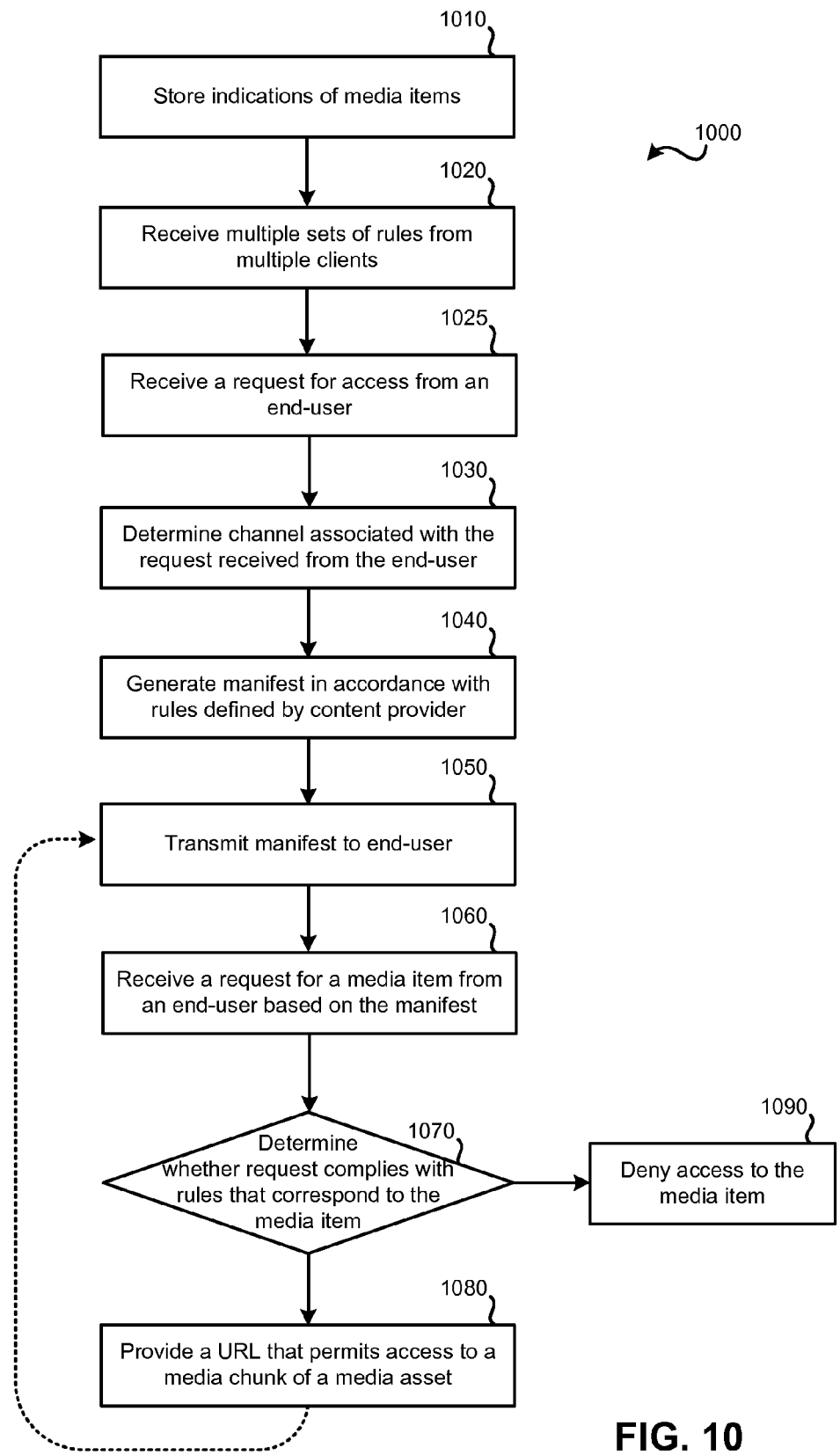
FIG. 10 illustrates yet another embodiment of a method for controlling access to media items.

FIG. 10 illustrates an embodiment of a method for controlling access to a set of media items. Method 1000 may be performed using the systems of FIGS. 5-7 or some other system that is configured for controlling access to media items. Each step of method 1000 may be performed by a computer system. Each step of method 1000 may be performed by CHIMPS. More specifically, each step of method 1000 may be performed by an application center of CHIMPS. Method 1000 may represent a more detailed embodiment of method 800 and/or method 900.

At step 1010, a plurality of indications of media items may be stored. Links, such as URIs or URLs, to other locations storing the media items may be stored. For example, these other locations may include one or more content data networks. In addition to storing the links, a copy of each media item may be stored.

At step 1020, multiple sets of rules may be received and stored. These rules may be received from multiple different content providers, which may be referred to as clients. These rules may define which media items are available through which channels to which end-users. The rules may identify which media items are available to specific end-users based on the identity of the end-user and/or the application being used by the end-user to access the media items. Rules received at step 1020 may be associated with a particular channel. As such, different channels may have different rules. The rules may also be associated with particular media items. Accordingly, different media items may have different associated rules.

At step 1025, a request may be received for access from an end-user. The request may be for access to all media items available via a particular channel or for one or more specific media items available via the channel. As such, this request may come in the form of the end-user attempting to access a particular channel. The request may specify information about the end-user, including the application being used and/or the IP address of the end-user. The request from the end-user is generated by a computerized device of the end-user.

At step 1030, a channel may be identified that is associated with the request received from the end-user. Based upon the application identified by the end-user's request, a particular channel being accessed by the end-user may be identified. As an example, if the end-user attempts to access domain 510 using a media streaming application associated with NBC, it may be determined that the NBC channel is associated with the end-user's request.

At step 1040, a manifest may be generated in accordance with a set of rules associated with the channel identified at step 1030. The manifest may list a plurality of URLs to be used to access media items (e.g., chunks, media assets) that in accordance with the rules of the channel are available to be accessed by the end-user. As such, media items not available to the end-user may not be identified by URLs in the generated manifest. The manifest may contain URLs and metadata. This manifest may be transmitted to the application being executed by the end-user at step 1050.

At step 1060, a request may be received for access to a media item based on a URL present in the manifest transmitted to the end-user at step 1050. For example, an end-user may request a first chunk of a media item listed in the manifest. In some embodiments, the request may be for a first media asset listed in the manifest.

At step 1070, it may be determined whether the request for the media item associated with the URL requested from the manifest received from the end-user complies with rules that correspond to the channel and/or media item attempting to be accessed. This determination may be made even if the manifest was generated in accordance with the rules associated with the channel being accessed. For example, the end-user's compliance with a rule may have changed since the manifest was generated. In some embodiments, the manifest may be generated a significant amount of time before a media item (e.g., a chunk) within the manifest is requested. For example, the manifest may have been generated an hour before the media item from the manifest was requested. In response to determining whether the request received from the end-user complies with the rules associated with the requested media item of the channel, access to the media item may be provided to the end-user at step 1080. Access may involve the end-user being directed to a content data network to stream the media item.

Following step 1080, method 1000 may return to step 1050. At step 1050, a request for the next media item of the manifest (e.g., the next chunk or media asset) may be received. As such, steps 1050 through 1080 may repeat multiple times in order to provide the end-user with each chunk of a media asset. For each chunk, it may be determined whether the request for the chunk complies with the rules associated with the media asset. While the user may have permission to view a first chunk of the media asset, the rules may prevent the end-user from viewing one or more later chunks. For example, an available time period specified within the rules associated with the media item may be expired after the user has successfully requested some number of chunks. Accordingly, by not granting the end-user permission to access additional chunks, the end-user may be prevented from viewing a remainder of a media asset.

If, at step 1070, the request received from the end-user does not comply with the rules associated with the channel and/or the media item requested by the end-user, access may be denied to the media item at step 1090. The end-user may be notified that access is not granted, or the request may fail to return chunks of the media asset.

Figure 11:
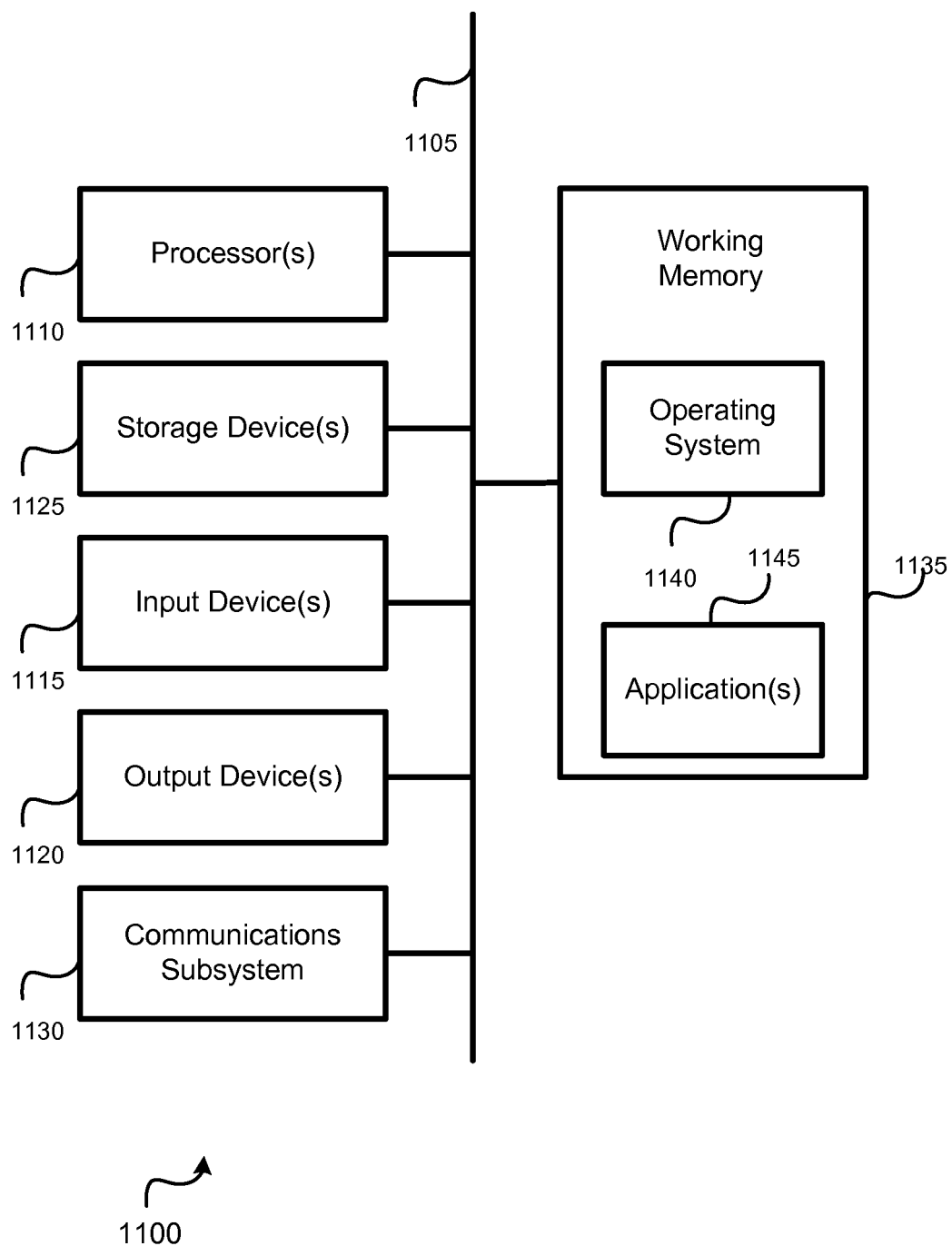
FIG. 11 illustrates a block diagram of an embodiment of a computer system.

To perform the actions of the described systems, computing devices may be used. A computer system as illustrated in FIG. 11 may be used. FIG. 11 provides a schematic illustration of an embodiment of a computer system 1100 that can perform the methods provided by various entities. A computer system may be used To transmit and receive the interactions performed by an end-user. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which can include without limitation a mouse, a keyboard, and/or the like; and one or more output devices 1120, which can include without limitation a display device, a printer, and/or the like.

The computer system 1100 may further include (and/or be in communication with) one or more storage devices 1125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1130 may permit data to be exchanged with a network (such as the network described below, to name one example), other computer systems, and/or any other devices described herein. In many embodiments, the computer system 1100 will further comprise a working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1125 described above. In some cases, the storage medium might be incorporated within a computer system, such as the computer system 1100. In other embodiments, the storage medium might be separate from a computer system (e.g., a removable medium, such as a compact disc), and or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1100) to perform methods in accordance with various embodiments of the invention. According to a set of embodiments, some or all of the procedures of such methods are performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1125. Volatile media include, without limitation, dynamic memory, such as the working memory 1135. Transmission media include, without limitation, coaxial cables, copper wire and fiber optics, including the wires that comprise the bus 1105, as well as the various components of the communication subsystem 1130 (and/or the media by which the communications subsystem 1130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals and/or the like, are all examples of carrier waves on which instructions can be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1105 retrieves and executes the instructions. The instructions received by the working memory 1135 may optionally be stored on a storage device 1125 either before or after execution by the processor(s) 1110.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A computer system for controlling access to a set of media items accessible via multiple channels, wherein the computer system comprises a processor and a non-transitory computer-readable storage medium, the computer-readable storage medium storing instructions configured to cause the computer system to:

store an indication for each media item of a set of media items;

receive a first set of rules defined by a first content provider, the first set of rules being used to determine accessibility to a first subset of the set of media items, wherein:

the first set of rules comprises one or more rules selected from the group consisting of:

a first rule defining a geographical region in which playback of the first subset of the set of media items is permitted;

a second rule restricting access to the first subset of the set of media items based on a type of device from which a request is received;

a third rule that defines one or more acceptable applications that can be used to view the first subset of media items; and a fourth rule defining a first quality of service (QoS) for playback of the first subset of the set of media items;

the first content provider is associated with a first channel; and the first subset of the set of media items represent media items associated with the first content provider that are available via the first channel;

receive a second set of rules defined by a second content provider, the second set of rules being used to determine accessibility to a second subset of the set of media items, wherein:

the first subset of the set of media items and the second subset of the set of media items comprise at least one media item in common;

the second set of rules defines one or more acceptable applications that can be used to view the second subset of media items;

the second content provider is associated with a second channel; and the second subset of the set of media items represent media items associated with the second content provider that are available via the second channel;

receive a first request for access to a media item of the set of media items from an instance of a first application, wherein:

the media item is common to the first subset of the set of media items and the second subset of the set of media items;

a single instance of the media item is stored in the set of media items; and the first application is executed remotely from the computer system; determine the first request is associated with a first channel, wherein:

the first channel is associated with the first application and the first set of rules;

provide access to the media item in accordance with the first set of rules;

receive a second request for access to the media item from an instance of a second application, wherein:
  the second application is executed remotely from the computer system and the first application;
  determine the second request is associated with a second channel, wherein
    the second channel is associated with the second application and the second subset of the set of media items; and
  provide access to the media item in accordance with the second set of rules.

2. The computer system for controlling access to the set of media items accessible via multiple channels of claim 1, wherein:
  the instructions configured to cause the computer system to provide access to the media item in accordance with the first set of rules comprise instructions configured to cause the computer system to:
    transmit, to the first application, a first universal resource locator that indicates a location at a content data network from where the first application is to retrieve the media item; and
  the instructions configured to cause the computer system to provide access to the media item in accordance with the second set of rules comprise instructions configured to cause the computer system to:
    transmit, to the first application, a second universal resource locator that indicates the location at the content data network from where the second application is to retrieve the media item.

3. The computer system for controlling access to the set of media items accessible via multiple channels of claim 2, wherein the media item is a chunk of a media asset.

4. The computer system for controlling access to the set of media items accessible via multiple channels of claim 3, wherein continuous playback of the chunk is configured to occur for, at most, a minute, and continuous playback of the media asset, is configured to occur for, at minimum, three minutes.

5. The computer system for controlling access to the set of media items accessible via multiple channels of claim 1, wherein the geographical region is defined as a set of Internet Protocol (IP) addresses.

6. The computer system for controlling access to the set of media items accessible via multiple channels of claim 1, wherein:
  the first set of rules specifies a time period in which playback of the media item is permitted.

7. The computer system for controlling access to the set of media items accessible via multiple channels of claim 1, wherein the instructions are further configured to cause the computer system to:
  generate a manifest that indicates multiple media items of the first subset of the set of media items accessible by the first application, wherein each of the multiple media items indicated are in accordance with the first set of rules; and
  transfer, to the first application, the manifest.

8. The computer system for controlling access to the set of media items accessible via multiple channels of claim 7, wherein:
  at least one media item of the first subset of the set of media items is not in accordance with the first set of rules; and
  the at least one media item is not indicated in the manifest.

9. A method for controlling access to a set of media items accessible via multiple channels, the method comprising:
  storing an indication for each media item of a set of media items;
  receiving a first set of rules defined by a first content provider, the first set of rules being used to determine accessibility to a first subset of the set of media items, wherein:
    the first set of rules comprises one or more rules selected from the group consisting of:
      a first rule defining a geographical region in which playback of the first subset of the set of media items is permitted;
      a second rule restricting access to the first subset of the set of media items based on a type of device from which a request is received;
      a third rule that defines one or more acceptable applications that can be used to view the first subset of media items; and
      a fourth rule defining a quality of service (QoS) for playback of the first subset of the set of media items;
    the first content provider is associated with a first channel; and
    the first subset of the set of media items represent media items associated with the first content provider that are available via the first channel;
  receiving a second set of rules defined by a second content provider, the second set of rules being used to determine accessibility of a second subset of the set of media items, wherein:
    the first subset of the set of media items and the second subset of the set of media items have at least one media item in common;
    the second set of rules defines one or more acceptable applications that can be used to view the second subset of media items;
    the second content provider is associated with a second channel; and
    the second subset of the set of media items represent media items associated with the second content provider that are available via the second channel;
  receiving a first request for access to a media item of the set of media items from an instance of a first application, wherein:
    the media item is common to the first subset of the set of media items and the second subset of the set of media items;
    a single instance of the media item is stored in the set of media items; and
    the first application is executed remotely;
  determining the first request is associated with a first channel, wherein:
    the first channel is associated with the first application and the first set of rules;
  providing access to the media item in accordance with the first set of rules;
  receiving a second request for access to the media item from an instance of a second application, wherein:
    the second application is executed remotely from the first application;
  determining the second request is associated with a second channel, wherein
    the second channel is associated with the second application and the second subset of the set of media items; and
  providing access to the media item in accordance with the second set of rules.

10. The method for controlling access to the set of media items accessible via multiple channels of claim 9, wherein providing access to the media item in accordance with the first set of rules comprises:
 transmitting, to the first application, a first universal resource indicator that indicates a location at a content data network from where the first application is to retrieve the media item; and
 providing access to the media item in accordance with the second set of rules comprises:
 transmitting, to the first application, a second universal resource indicator that indicates the location at the content data network from where the second application is to retrieve the media item.

11. The method for controlling access to the set of media items accessible via multiple channels of claim 10, wherein the media item is a chunk of a media asset.

12. The method for controlling access to the set of media items accessible via multiple channels of claim 11, wherein continuous playback of the chunk is configured to occur for, at most, a minute, and continuous playback of the media asset, is configured to occur for, at minimum, three minutes.

13. The method for controlling access to the set of media items accessible via multiple channels of claim 1, wherein the geographical region is defined as a set of Internet Protocol (IP) addresses.

14. The method for controlling access to the set of media items accessible via multiple channels of claim 9, wherein:
 the first set of rules specifies a time period in which playback of the media item is permitted.

15. The method for controlling access to the set of media items accessible via multiple channels of claim 9, further comprising:
 generating a manifest that indicates multiple media items of the first subset of the set of media items accessible by the first application, wherein each of the multiple media items indicated are in accordance with the first set of rules; and
 transferring, to the first application, the manifest.

16. The method for controlling access to the set of media items accessible via multiple channels of claim 15, wherein:
 at least one media item of the first subset of the set of media items does not comply with the first set of rules; and
 the at least one media item is not indicated in the manifest.

17. A computer program product for controlling access to a set of media items accessible via multiple channels, wherein the computer program product is stored using a non-transitory computer-readable medium and comprises instructions, which, when executed, cause a computer system to:
 receive a first set of rules defined by a first content provider, the first set of rules being used to determine accessibility to a first subset of the set of media items, wherein:
 the first set of rules comprises one or more rules selected from the group consisting of:
 a first rule defining a geographical region in which playback of the first subset of the set of media items is permitted;
 a second rule restricting access to the first subset of the set of media items based on a type of device from which a request is received;
 a third rule that defines one or more acceptable applications that can be used to view the first subset of media items; and
 a fourth rule defining a quality of service (QoS) for playback of the first subset of the set of media items;
 the first content provider is associated with a first channel; and
 the first subset of the set of media items represent media items associated with the first content provider that are available via the first channel;
 receive a second set of rules defined by a second content provider, the second set of rules being used to determine accessibility to a second subset of the set of media items, wherein:
 the second set of rules defines one or more acceptable applications that can be used to view the second subset of media items;
 the second content provider is associated with a second channel; and
 the second subset of the set of media items represent media items associated with the second content provider that are available via the second channel;
 receive a first request for access to a media item of the set of media items from an instance of a first application, wherein:
 the media item is common to the first subset of the set of media items and the second subset of the set of media items; and
 a single instance of the media item is stored in the set of media items;
 determine the first request is associated with a first channel, wherein:
 the first channel is associated with the first application and the first set of rules; and
 provide access to the media item in accordance with the first set of rules;
 receive a second request for access to the media item from an instance of a second application;
 determine the second request is associated with a second channel;
 the second channel is associated with the second application and the second subset of the set of media items; and
 provide access to the media item in accordance with the second set of rules.

18. The computer program product for controlling access to the set of media items accessible via multiple channels of claim 17, wherein the computer program product further comprises instructions that when executed, cause the computer system to:
 generate a manifest that indicates multiple media items of the first subset of the set of media items accessible by the first application, wherein each of the multiple media items indicated is in accordance with the first set of rules; and
 transfer, to the first application, the manifest.

19. The computer system for controlling access to the set of media items accessible via multiple channels of claim 1, wherein:
 the second set of rules restricts access to the second subset of the set of media items based on a type of device from which requests are received.

20. The computer system for controlling access to the set of media items accessible via multiple channels of claim 1, wherein the first set of rules and the second set of rules define at least one different acceptable application.

21. The computer system for controlling access to the set of media items accessible via multiple channels of claim 1, wherein:

the second set of rules defines a second quality of service (QoS) for playback of the media item.

* * * * *